(12) United States Patent
Cui et al.

(10) Patent No.: US 12,305,998 B2
(45) Date of Patent: May 20, 2025

(54) ROUTE DETERMINATION METHOD, APPARATUS, SERVER AND STORAGE MEDIUM FOR COLD CHAIN DISTRIBUTION

(71) Applicant: BEIJING JINGDONG ZHENSHI INFORMATION TECHNOLOGY CO., LTD., Beijing (CN)

(72) Inventors: Xiaozhi Cui, Beijing (CN); Hongyu Dong, Beijing (CN); Zhen Guo, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 327 days.

(21) Appl. No.: 17/801,081

(22) PCT Filed: Dec. 11, 2020

(86) PCT No.: PCT/CN2020/135880
§ 371 (c)(1),
(2) Date: Aug. 19, 2022

(87) PCT Pub. No.: WO2021/164390
PCT Pub. Date: Aug. 26, 2021

(65) Prior Publication Data
US 2023/0084312 A1    Mar. 16, 2023

(30) Foreign Application Priority Data

Feb. 21, 2020 (CN) .......................... 202010108742.1

(51) Int. Cl.
*G01C 21/34* (2006.01)
*G01C 21/36* (2006.01)

(52) U.S. Cl.
CPC ..... *G01C 21/3461* (2013.01); *G01C 21/3492* (2013.01); *G01C 21/3617* (2013.01)

(58) Field of Classification Search
CPC ............ G01C 21/3461; G01C 21/3492; G01C 21/3617; G01C 21/343; G01C 21/3453;
(Continued)

(56) References Cited

U.S. PATENT DOCUMENTS 6,879,972 B2 *  4/2005  Brandon ................ G06Q 10/10
                                                             706/14
6,982,708 B1 *  1/2006  Mah ..................... G06F 16/9577
                                                             345/418
(Continued)

FOREIGN PATENT DOCUMENTS

CN      101739812 A      6/2010
CN      106779570 A      5/2017
(Continued)

OTHER PUBLICATIONS

The Office Action for Chinese Patent Application No. 202010108742. 1, dated Jul. 21, 2023.
(Continued)

*Primary Examiner* — Frederick M Brushaber

(57) ABSTRACT

A route determination method, apparatus, server, and storage medium for cold chain distribution, and the method includes: receiving a route determination request from a terminal device, where the route determination request includes: location information of each customer point in a set of customer points to be distributed and location information of a distribution center (21); determining at least one target distribution route according to the location information of each customer point in the set of customer points to be distributed, the location information of the distribution center, scenario constraints and transportation cost constraints (22); and pushing the at least one target distribution route
(Continued)

route to the terminal device (23). In this method, the target distribution route determined under the scenario constraints and the transportation cost constraints can meet the distribution time-effect and transportation cost constraints, thereby reducing the transportation cost on the basis of improving the user satisfaction.

20 Claims, 13 Drawing Sheets

(58) Field of Classification Search
CPC .. G01C 21/00; G06Q 10/047; G06Q 10/0832; G06Q 10/08355; G06F 16/9537
See application file for complete search history.

(56) References Cited

U.S. PATENT DOCUMENTS

| | | | |
|---|---|---|---|
| 7,363,126 B1* | 4/2008 | Zhong | G01C 21/3484 701/25 |
| 8,112,300 B2* | 2/2012 | Harper | G06N 3/126 705/7.26 |
| 10,078,916 B2* | 9/2018 | Elazary | G06T 7/20 |
| 10,565,543 B1 | 2/2020 | Mo et al. | |
| 2003/0084011 A1* | 5/2003 | Shetty | G06Q 10/047 706/13 |
| 2007/0194912 A1 | 8/2007 | Lee et al. | |
| 2019/0114564 A1 | 4/2019 | Ferguson et al. | |
| 2020/0034757 A1 | 1/2020 | Gupta et al. | |
| 2022/0178706 A1* | 6/2022 | Okuda | G01C 21/3605 |

FOREIGN PATENT DOCUMENTS

| | | |
|---|---|---|
| CN | 107464018 A | 12/2017 |
| CN | 107977739 A | 5/2018 |
| CN | 108510227 A | 9/2018 |
| CN | 109389239 A | 2/2019 |
| CN | 109726863 A | 5/2019 |
| CN | 110059934 A | 7/2019 |
| CN | 110189073 A | 8/2019 |
| JP | 2002-302257 A | 10/2002 |
| JP | 2003-109170 A | 4/2003 |
| JP | 2008-114960 A | 5/2008 |
| JP | 2010-111452 A | 5/2010 |
| JP | 2014-153264 A | 8/2014 |
| KR | 10-2014-0031611 A | 3/2014 |
| KR | 10-2018-0086084 A | 7/2018 |
| WO | 2020/012241 A1 | 1/2020 |
| WO | 2020/030028 A1 | 2/2020 |

OTHER PUBLICATIONS

The Extended European Search Report for European Patent Application No. 20920599.6, dated Jul. 31, 2023.
The Notice of Reasons for Refusal for Japanese Patent Application No. 2022-525754, dated Jun. 12, 2023.
The Request for the Submission of an Opinion for Korean Patent Application No. 10-2022-7011707, dated May 9, 2023.
Feng Wen et al., "A Multistage Method for Multiobjective Route Selection", IEICE Trans.Fundamentals, Oct. 2009, pp. 2618-2625, vol. E92A, XP001550857.
Andriy Burkov, "Machine learning 100 + page essence", Dec. 21, 2019, first edition, pp. 59-61.

* cited by examiner

ROUTE DETERMINATION METHOD, APPARATUS, SERVER AND STORAGE MEDIUM FOR COLD CHAIN DISTRIBUTION

CROSS-REFERENCE TO RELATED APPLICATION

The present application is a National Stage of International Application No. PCT/CN2020/135880, filed on Dec. 11, 2020, which claims priority to Chinese patent application No. 202010108742.1, filed in China National Intellectual Property Administration on Feb. 21, 2020, entitled "ROUTE DETERMINATION METHOD, APPARATUS, SERVER AND STORAGE MEDIUM FOR COLD CHAIN DISTRIBUTION". Both of these two applications are incorporated herein by reference as if reproduced in their entireties.

TECHNICAL FIELD

The present application relates to the technical field of logistics, and in particular, to a route determination method, apparatus, server and storage medium for cold chain distribution.

BACKGROUND

The cold chain logistics generally refers to a systematic project in which refrigerated and frozen products are always in a specified low temperature environment in all aspects of production, storage, transportation, sales, and before consumption to ensure the quality and performance of products, and tends to be more time-sensitive than regular logistics. Therefore, it is very important to plan a distribution route that is economical and meets the time window requirements of merchants or customers.

SUMMARY

The present application provides a route determination method, apparatus, server and storage medium for cold chain distribution, which are used to determine a target route in the scenario constraints of cold chain distribution.

In a first aspect, an embodiment of the present application provides a route determination method for cold chain distribution, including:
receiving a route determination request from a terminal device, where the route determination request includes: location information of each customer point in a set of customer points to be distributed and location information of a distribution center;
determining at least one target distribution route according to the location information of each customer point in the set of customer points to be distributed, the location information of the distribution center, scenario constraints and transportation cost constraints; and
pushing the at least one target distribution route to the terminal device.

In a possible design of the first aspect, the determining at least one target distribution route according to the location information of each customer point in the set of customer points to be distributed, the location information of the distribution center, scenario constraints and transportation cost constraints, includes:
determining at least one initial planned route according to the location information of each customer point in the set of customer points to be distributed, the location information of the distribution center, and the scenario constraints, where the scenario constraints include: time window constraints of the customer points, on-route duration constraints, single-vehicle distribution, and no returning to the distribution center; and
iteratively updating each initial planned route with a solving goal of lowest total transportation cost, to determine the at least one target distribution route.

In an embodiment, the determining at least one initial planned route according to the location information of each customer point in the set of customer points to be distributed, the location information of the distribution center, and the scenario constraints, includes:
establishing a first initial planned route according to the location information of each customer point in the set of customer points to be distributed and the location information of the distribution center, where a seeded customer point of the first initial planned route meets the scenario constraints and is a farthest customer point from the distribution center;
sequentially inserting customer points in the set of customer points to be distributed into the first initial planned route based on a preset algorithm, until the customer points to be inserted do not meet the scenario constraints; and
establishing a second initial planned route based on remaining customer points in the set of customer points to be distributed when a customer point to be inserted does not meet the scenario constraints.

In an embodiment, before the establishing a first initial planned route according to the location information of each customer point in the set of customer points to be distributed and the location information of the distribution center, the method further includes:
determining, according to the location information of each customer point in the set of customer points to be distributed and the location information of the distribution center, a navigation distance between any two customer points and a navigation distance between each customer point and the distribution center; and
building a distance matrix according to the navigation distance between any two customer points and the navigation distance between each customer point and the distribution center;
the sequentially inserting customer points in the set of customer points to be distributed into the first initial planned route based on a preset algorithm, includes:
sequentially inserting the customer points in the set of customer points to be distributed into the first initial planned route based on a nearest neighbor interpolation method, the distance matrix and a saving algorithm.

Further, the iteratively updating each initial planned route with a solution target of lowest total transportation cost, to determine the at least one target distribution route, includes:
calculating total transportation cost for each initial planned route;
for each initial planned route, determining a plurality of updated initial planned routes and separately calculating total transportation cost of each updated initial planned route by destroying-reestablishing the initial planned route based on a distribution sequence of customer points on the initial planned route; and
determining the target distribution route based on the total transportation cost of all updated initial planned routes, where the target distribution route has a lowest total transportation cost among all the updated initial planned routes.

In another possible design of the first aspect, the determining at least one target distribution route according to the location information of each customer point in the set of customer points to be distributed, the location information of the distribution center, scenario constraints and transportation cost constraints, includes:

inputting the location information of all customer points in the set of customer points to be distributed and the location information of the distribution center into a wiring model, and outputting the at least one target distribution route, where customer points in each target distribution route meet the scenario constraints, and transportation cost of each target distribution route meets the transportation cost constraints.

In an embodiment, the method further includes:

respectively operating the wiring model with different parameter values according to a preset number of cycles, to obtain parameter values of each operation and a result of each operation for the wiring model;

obtaining a data set according to the parameter values of all operations and the results of all operations for the wiring model, where the data set includes training data and test data;

processing the training data by a preset algorithm, to determine an important parameter set of the wiring model; and determining a value range of each important parameter in the important parameter set by combining the important parameter set and the test data.

In an embodiment, the method further includes:

for the value range of each important parameter in the important parameter set, determining a parameter grid corresponding to the important parameter set based on a grid-search algorithm;

performing cross-validation on the parameter grid and the training data to determine an optimal parameter combination, where the optimal parameter combination includes: a plurality of important parameters and a value of each important parameter; and updating the wiring model by using the optimal parameter combination and the training data.

In an embodiment, the method further includes:

evaluating performances of the updated wiring model using the test data, to determine wiring performances of the updated wiring model.

In a second aspect, the present application provides a route determination apparatus for cold chain distribution, including: a receiving module, a processing module and a pushing module; where the receiving module is configured to receive a route determination request from a terminal device, where the route determination request includes: location information of each customer point in a set of customer points to be distributed and location information of a distribution center;

the processing module is configured to determine at least one target distribution route according to the location information of each customer point in the set of customer points to be distributed, the location information of the distribution center, scenario constraints and transportation cost constraints; and the pushing module is configured to push the at least one target distribution route to the terminal device.

In a possible design of the second aspect, the processing module includes: a first processing unit and a second processing unit; where the first processing unit is configured to determine at least one initial planned route according to the location information of each customer point in the set of customer points to be distributed, the location information of the distribution center, and the scenario constraints, where the scenario constraints include: time window constraints of the customer points, on-route duration constraints, single-vehicle distribution, and no returning to the distribution center; and the second processing unit is configured to iteratively update each initial planned route with a solution target of lowest total transportation cost, to determine the at least one target distribution route.

In an embodiment, the first processing unit is specifically configured to:

establish a first initial planned route according to the location information of each customer point in the set of customer points to be distributed and the location information of the distribution center, where a seeded customer point of the first initial planned route meets the scenario constraints and is a farthest customer point from the distribution center;

sequentially insert customer points in the set of customer points to be distributed into the first initial planned route based on a preset algorithm, until the customer points to be inserted do not meet the scenario constraints; and establish a second initial planned route based on remaining customer points in the set of customer points to be distributed when a customer point to be inserted does not meet the scenario constraints.

In an embodiment, the first processing unit is further configured to, before establishing the first initial planned route according to the location information of each customer point in the set of customer points to be distributed and the location information of the distribution center, determine, according to the location information of each customer point in the set of customer points to be distributed and the location information of the distribution center, a navigation distance between any two customer points and a navigation distance between each customer point and the distribution center; and build a distance matrix according to the navigation distance between any two customer points and the navigation distance between each customer point and the distribution center;

the first processing unit is configured to sequentially insert the customer points in the set of customer points to be distributed into the first initial planned route, is specifically that:

the first processing unit is specifically configured to sequentially insert the customer points in the set of customer points to be distributed into the first initial planned route based on a nearest neighbor interpolation method, the distance matrix and a saving algorithm.

Further, the second processing unit is specifically configured to:

calculate total transportation cost for each initial planned route;

for each initial planned route, determine a plurality of updated initial planned routes and separately calculate total transportation cost of each updated initial planned route by destroying-reestablishing the initial planned route based on a distribution sequence of customer points on the initial planned route; and determine the target distribution route based on the total transportation cost of all updated initial planned routes, where the target distribution route has a lowest total transportation cost among all the updated initial planned routes.

In another possible design of the second aspect, the processing module is specifically configured to input the location information of all customer points in the set of customer points to be distributed and the location information of the distribution center into a wiring model, and output the at least one target distribution route, where customer points in each target distribution route meet the scenario constraints, and transportation cost of each target distribution route meets the transportation cost constraints.

In an embodiment, the processing module is further configured to:
respectively operate the wiring model with different parameter values according to a preset number of cycles, to obtain parameter values of each operation and a result of each operation for the wiring model;
obtain a data set according to the parameter values of all operations and the results of all operations for the wiring model, where the data set includes training data and test data;
process the training data by a preset algorithm, to determine an important parameter set of the wiring model; and
determine a value range of each important parameter in the important parameter set by combining the important parameter set and the test data.

In an embodiment, the processing module is further configured to:
for the value range of each important parameter in the important parameter set, determine a parameter grid corresponding to the important parameter set based on a grid-search algorithm;
perform cross-validation on the parameter grid and the training data to determine an optimal parameter combination, where the optimal parameter combination includes: a plurality of important parameters and a value of each important parameter; and
update the wiring model by using the optimal parameter combination and the training data.

In an embodiment, the processing module is further configured to evaluate performances of the updated wiring model using the test data, to determine wiring performances of the updated wiring model.

In a third aspect, an embodiment of the present application provides a server, including:
a processor, a memory, and computer program instructions stored on the memory and executable on the processor, where the method according to the first aspect is implemented when the processor executes the computer program instructions.

In an embodiment, the above processor may be a chip.

In a fourth aspect, an embodiment of the present application may provide a computer-readable storage medium having stored therein computer program instructions, which, when executed by a processor, cause the method according to the first aspect to be implemented.

In a fifth aspect, an embodiment of the present application provides a computer program, which, when executed by a processor, causes the method according to the first aspect to be implemented.

In a sixth aspect, an embodiment of the present application provides a computer program product containing a computer program, which, when running on a computer, causes the computer to perform the method according to the first aspect.

In a seventh aspect, an embodiment of the present application provides a chip, including: a processing module and a communication interface, where the processing module can perform the method according to the first aspect.

Further, the chip further includes a storage module (e.g., a memory), where the storage module is configured to store instructions, the processing module is configured to execute the instructions stored in the storage module, so that the processing module performs the method according to the first aspect.

In an eighth aspect, an embodiment of the present application provides a chip for running instructions, where the chip includes a memory and a processor, the memory stores therein codes and data, the memory is coupled to the processor, and the processor executes the codes in the memory to cause the chip to perform the method according to the first aspect.

The route determination method, apparatus, server, and storage medium for cold chain distribution provided by the embodiments of the present application, receive a route determination request from a terminal device, where the route determination request includes: location information of each customer point in a set of customer points to be distributed and the location information of a distribution center; determine at least one target distribution route according to the location information of each customer point in the set of customer points to be distributed, the location information of the distribution center, scenario constraints and transportation cost constraints; and push the at least one target distribution route to the terminal device.

DESCRIPTION OF EMBODIMENTS

In order to make the purpose, technical solutions and advantages of the embodiments of the present application clearer, the technical solutions in the embodiments of the present application will be clearly and completely described below in conjunction with the accompanying drawings in the embodiments of the present application. Apparently, the described embodiments are a part of the embodiments of the present application, rather than all of the embodiments. Based on the embodiments in the present application, all other embodiments obtained by those of ordinary skill in the art without creative work shall fall within the scope of protection of the present application.

At present, the cold chain market is booming, occupies a larger and larger proportion in the entire logistics market, and is also getting more and more attention of people. Meanwhile, people always have high requirements for cold chain distribution: uninterrupted refrigerated production, rapid distribution, and high time-effect. In this regard, it is particularly important to plan a wiring result for the cold chain distribution that has a short transportation distance and meets the customer's time window, so as to maintain, to the utmost extent, quality or efficiency of the transported products, to improve customer satisfaction, and to reduce transportation costs.

At present, the path planning solution for large-scale open scenarios with complex constraints mainly considers constraints such as adding penalty for exceeding the time window constraints and fuzzy travel time, and returning to the distribution center, and uses genetic algorithms for solution. In the research of cold chain logistics distribution path optimization, for the case of adding penalty for exceeding the customer's time window without considering the on-route duration constraints, nor returning to the distribution center, the saving algorithm, genetic algorithm and particle swarm algorithm are used.

In the related art, the cold chain distribution scenario is mainly suitable for the scenario of adding penalty constraints for exceeding the time window and fuzzy travel time and returning to the distribution center, without considering the on-route duration constraints, and cannot be fully applied to some actual distribution scenarios; for example, the cold chain city distribution scenario with time window constraints, involving a large number of customer points (greater than 500), single-vehicle distribution, strict time window constraints, on-route duration constraints, and no returning to the distribution center after distribution is completed, etc., is to minimize the total transportation distance.

In summary, the existing cold chain distribution solutions cannot be applied to some cold chain city distribution scenarios with practical application scenarios and time windows, and a route determination method for cold chain distribution is urgently needed to improve the distribution time-effect and performance.

Figure 1:
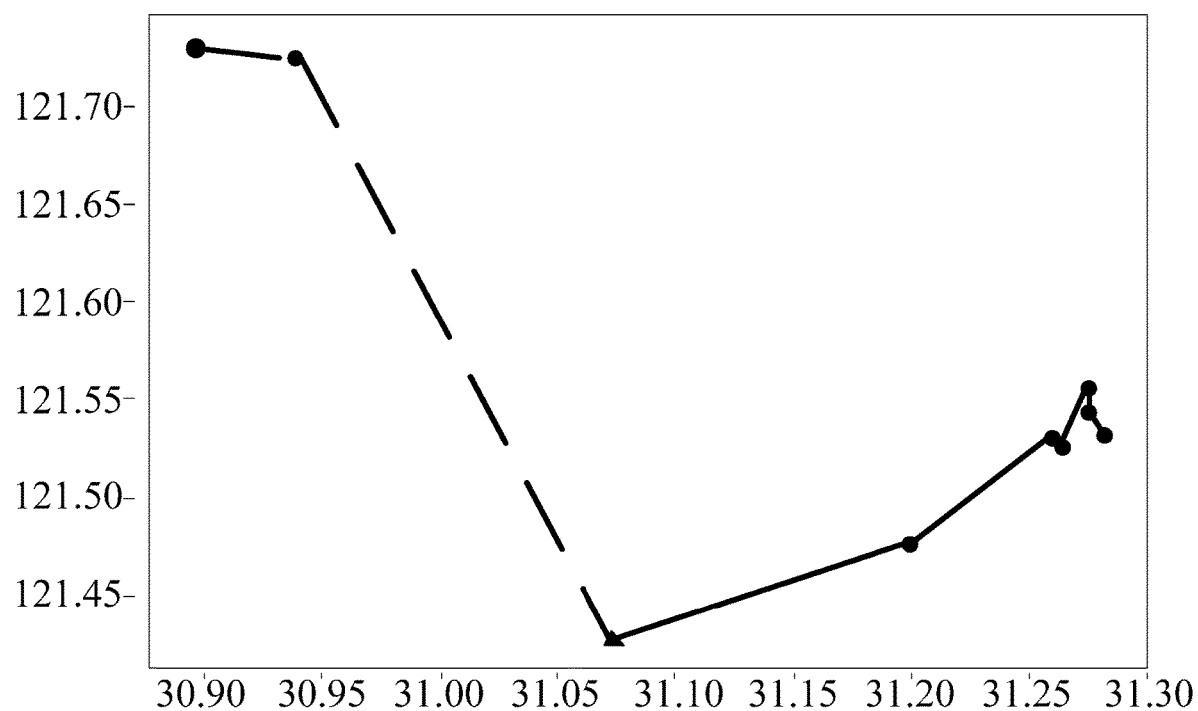
FIG. 1 is a schematic diagram of an application scenario of a route determination method for cold chain distribution provided by an embodiment of the present application.

For example, FIG. 1 is a schematic diagram of an application scenario of a route determination method for cold chain distribution provided by an embodiment of the present application. Referring to FIG. 1, the application scenario may include: a distribution center, multiple customer points and a server (not shown). After receiving location information of all customer points to be distributed and location information of the distribution center sent by a user through a terminal device, the server determines at least one target distribution route according to a positional relationship between the distribution center and the multiple customer points, and pushes it to the terminal device. In this way, based on the at least one target distribution route, the user can respectively distribute products to the multiple customer points by means of at least one vehicle. In an embodiment, when two or more vehicles are required, the above vehicles may be of the same type (single-vehicle type).

Specifically, for the application scenario shown in FIG. 1, the overall idea of the route determination method for cold chain distribution proposed in the present application is to find the optimal solution for solving the problem of smart wiring for large-scale cold chain city distribution in open scenarios. Under the pre-set scenario constraints, taking the transportation cost constraints as the target, at least one target distribution route is determined based on the location information of each customer point in both the distribution center and the set of customer points to be distributed.

For example, the application scenario shown in FIG. 1 includes one distribution center and eight customer points, in which the triangle shape represents the distribution center, the solid dots represent customer points, the abscissa is the longitude value, and the ordinate is the latitude value. According to the technical solution of the present application, after receiving, from the terminal device, the location information of the above one distribution center and the location information of the eight customer points, the server can plan two target distribution routes (solid line and dotted line) for the eight customer points, of which one (solid line) goes through six customer points in total, and the other one (dotted line) goes through two customer points. And it has been verified that distributing goods from the distribution center to the customer point using these two target distribution routes may meet all the scenario constraints with low transportation costs.

It can be understood that the server in the above application scenario shown in FIG. 1 may be a background processing platform or the like. This embodiment is explained by taking the server as the execution subject of the route determination method for cold chain distribution.

The technical solution of the present application will be described in detail below through specific embodiments. It should be noted that the following specific embodiments may be combined with each other, and the same or similar concepts or processes may not be repeated in some embodiments.

Figure 2:
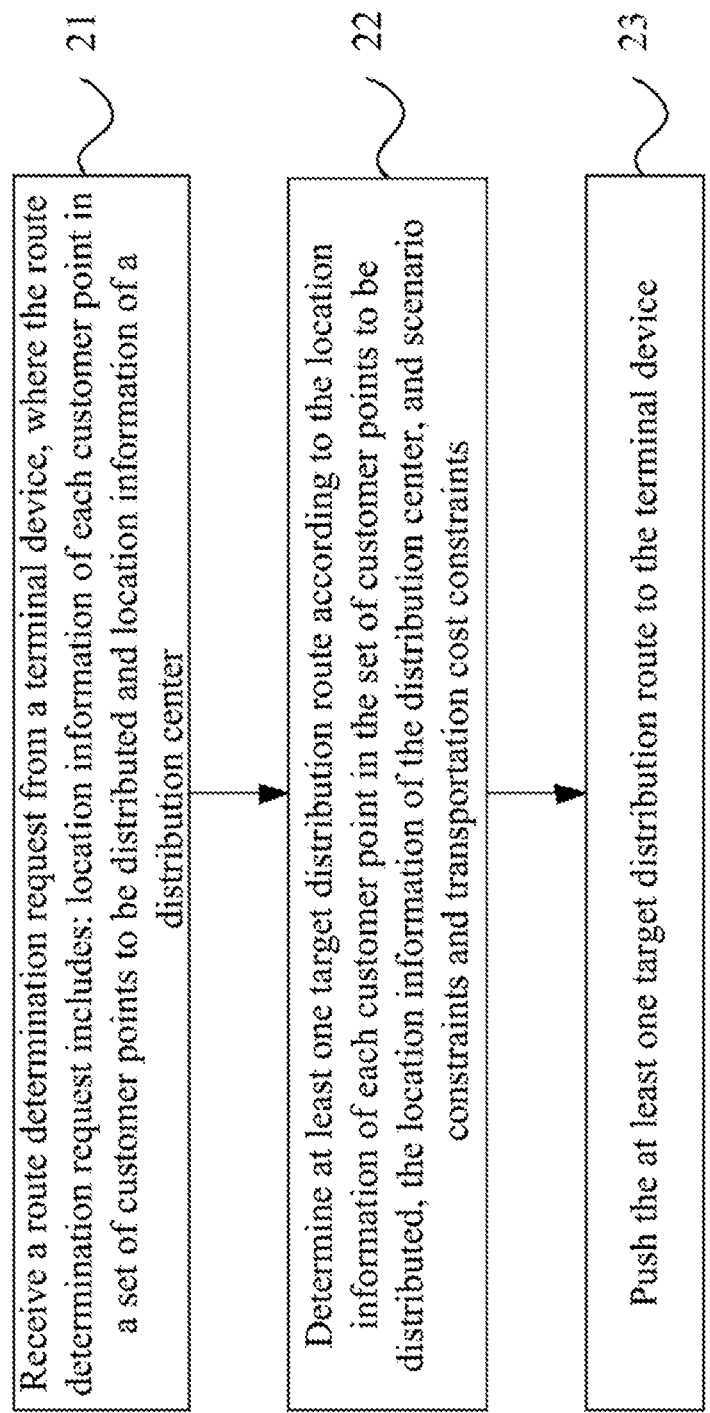
FIG. 2 is a schematic flowchart of Embodiment I of a route determination method for cold chain distribution provided by an embodiment of the present application.

FIG. 2 is a schematic flowchart of Embodiment I of a route determination method for cold chain distribution provided by an embodiment of the present application. As shown in FIG. 2, the method may include the following steps.

Step 21, receive a route determination request from a terminal device, where the route determination request includes: location information of each customer point in a set of customer points to be distributed and location information of a distribution center.

In the cold chain distribution scenario, when goods need to be distributed from the distribution center to each customer point in the set of customer points to be distributed, managers use the server to determine the target distribution route.

In an embodiment, the managers can input the location information of each customer point in the set of customer points to be distributed and the location information of the distribution center into the server through the terminal device, so that the server obtains the location information of each customer point and the location information of the distribution center, and determines the distribution route accordingly.

For example, assuming that the set of customer points to be distributed includes a total of four customer points, information of the distribution center and the customer points is shown in Table 1. Table 1 shows the information of each customer point in the set of customer points to be distributed and the information of the distribution center.

TABLE 1

Information of Each customer Point in the Set of customer Points to be distributed and the Information of the Distribution Center

| ID | Type | Address (location information) | Earliest arrival time | latest arrival time |
|---|---|---|---|---|
| 0 | 1 | No. 001, xx district, xx city | 08:00 | 00:00 |
| 01 | 2 | No. 158, xx district, xx city | 09:30 | 10:00 |
| 02 | 2 | No. 55, xx district, xx city | 08:00 | 10:00 |
| 03 | 2 | No. 50, xx district, xx city | 10:00 | 10:30 |
| 04 | 2 | No. 2517, xx district, xx city | 09:30 | 10:00 |

In the above table, ID represents number, Type represents the type, 1 represents the distribution center, and 2 represents the customer point; Address, the plaintext address in the embodiment of the present application, can be converted into latitude and longitude for use in the calculation process; the time period consisting of the earliest arrival time and the latest arrival time is the requested arrival time period requested by the customer.

It can be understood that the specific values of the location information, the earliest arrival time and the latest arrival time in Table 1 can be determined as required, which will not be repeated herein.

Step 22, determine at least one target distribution route according to the location information of each customer point in the set of customer points to be distributed, the location information of the distribution center, and scenario constraints and transportation cost constraints.

In this embodiment, because of the characteristics of cold chain distribution, such as uninterrupted refrigerated production, rapid distribution, and high time-effect, in order to determine an optimal target distribution route, under the scenario constraints, taking the transportation cost constraints as the target, the server is required to determine the distribution route based on the location information of each customer point in the distribution center and the set of customer points to be distributed. In this way, it can not only reduce the transportation cost, but also ensure the quality and efficiency of the distributed goods.

It is understandable that when there are many customer points in the set of customer points to be distributed, in order to meet the scenario constraints and transportation cost constraints, there may be more than one determined target distributed route. The number of the determined distributed routes may be determined as required, which will not be repeated herein.

Step 23, push the at least one target distribution route to the terminal device.

In this embodiment, after determining at least one target distribution route corresponding to the above route determination request, the server then pushes the at least one target distribution route to the administrator through the terminal device. In this way, the manager can distribute goods to the customers in the set of customers to be distributed based on the at least one target distribution route.

The route determination method for cold chain distribution provided by the embodiment of the present application, receives a route determination request including location information of each customer point in a set of customer points to be distributed and location information of a distribution center from a terminal device, determines at least one target distribution route according to the location information of each customer point in the set of customer points to be distributed, the location information of the distribution center, scenario constraints and transportation cost constraints, and pushes the at least one target distribution route to the terminal device. In this technical solution, the target distribution route determined under the scenario constraints and the transportation cost constraints can meet the distribution time-effect and transportation cost constraints, thereby reducing the transportation cost on the basis of improving the user satisfaction.

For example, in a possible design of the present application, the overall idea of the route determination method for cold chain distribution is to find the optimal solution for solving the problem of smart wiring for large-scale cold chain city distribution in open scenarios. Scenario constraints to be met include: strict time window constraints, on-route duration constraints, single-vehicle type (capacity and carrying constraints), no returning to the distribution center, etc. The main technical route adopted is: first, an initial planned route is established using an insertion algorithm, which combines the nearest neighbor method and the saving method, and the customer point is inserted into the initial planned route, where each insertion during the insertion process must meet all the above constraints; and then an adaptive neighborhood search algorithm is used to iteratively find the optimal solution, where the termination conditions of the iteration mainly include the number of iterations, the solving time of the algorithm, the iterative interval when a better solution is not found in succession for termination, and so on. The specific plan is as follows.

Figure 3:
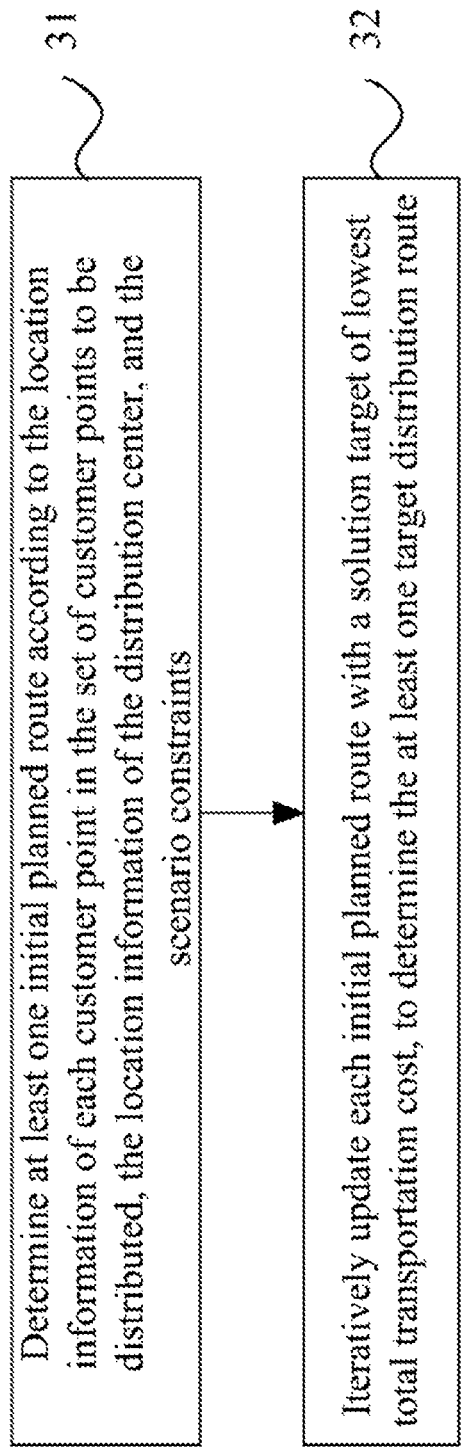
FIG. 3 is a schematic flowchart of Embodiment II of a route determination method for cold chain distribution provided by an embodiment of the present application.

For example, FIG. 3 is a schematic flowchart of Embodiment II of a route determination method for cold chain distribution provided by an embodiment of the present application. Referring to FIG. 3, in this embodiment, the above step 22 may be implemented by the following steps.

Step 31, determine at least one initial planned route according to the location information of each customer point in the set of customer points to be distributed, the location information of the distribution center, and the scenario constraints.

The scenario constraints include: time window constraints of the customer points, on-route duration constraints, single-vehicle distribution, and no returning to the distribution center.

In the embodiment of the present application, the process of determining, by the server, at least one initial planned route according to the location information of each customer point in the set of customer points to be distributed, the location information of the distribution center, and the scenario constraints, is the process of establishing the initial solution; specifically, it is a process of obtaining at least one feasible solution through a preset algorithm.

In this embodiment, in the process of determining the initial planned route by the server, whether the scenario constraints are met will be determined each time a customer point is added to the initial planned route. Therefore, the determined initial planned route must be a feasible route.

Step 32, iteratively update each initial planned route with a solution target of lowest total transportation cost, to determine the at least one target distribution route.

For example, this embodiment takes the total transportation cost of each initial planned route as the solution target, uses the iterative search to find a better planned route (with respect to the initial planned route) that meets the optimal condition (i.e., minimum transportation cost).

As an example, the objective function used in the solution in this application is to minimize the total transportation distance Min, and the specific formula is as follows:

$$\text{Min} = \sum_{i=1}^{n} \sum_{j=0}^{lr-1} d_{ijk}, i = 1, 2, \ldots, n, k = j+1 \quad (1)$$

$$\text{eat}_{ij} \in t_{ij}, i = 1, 2, \ldots, n; j = 1, 2, \ldots, lr \quad (2)$$

$$st_i \leq tr \quad (3)$$

where formula (1) is the objective function: minimizing the total transportation distance, formula (2) represents the time window constraints of the customer point, and formula (3) represents the on-route duration constraints.

Specifically, n is the total number of smart wiring; lr is the total number of customer points in the $i^{th}$ route; $d_{ijk}$ is the distance between the $j^{th}$ customer point and the $k^{th}$ customer point in the $i^{th}$ route, and when j is 0, it represents the distribution center; $t_{ij}=[t_{ij0}, t_{ij1}]$ represents the time window of the $j^{th}$ customer point in the $i^{th}$ route, where $t_{ij0}$ is the start time of $t_{ij}$, and $t_{ij1}$ is the end time of $t_{ij}$; $\text{eat}_{ij}$ represents the estimated arrival time of the $j^{th}$ customer point in the ith route; $st_i$ is the on-route duration of the $i^{th}$ route; $st_i=\Sigma_i^{lr-1}t_{jk}$, k=j+1, $t_{jk}$ is the duration required from the $j^{th}$ customer point to the $k^{th}$ customer point; tr is the preset duration, and is a given constant value.

In an embodiment, the present application can find a better solution, iteratively, based on the adaptive neighborhood search algorithm framework. For the specific implementation principle, reference may be made to the description in the following embodiment of FIG. 4, which will not be repeated herein.

Figure 4:
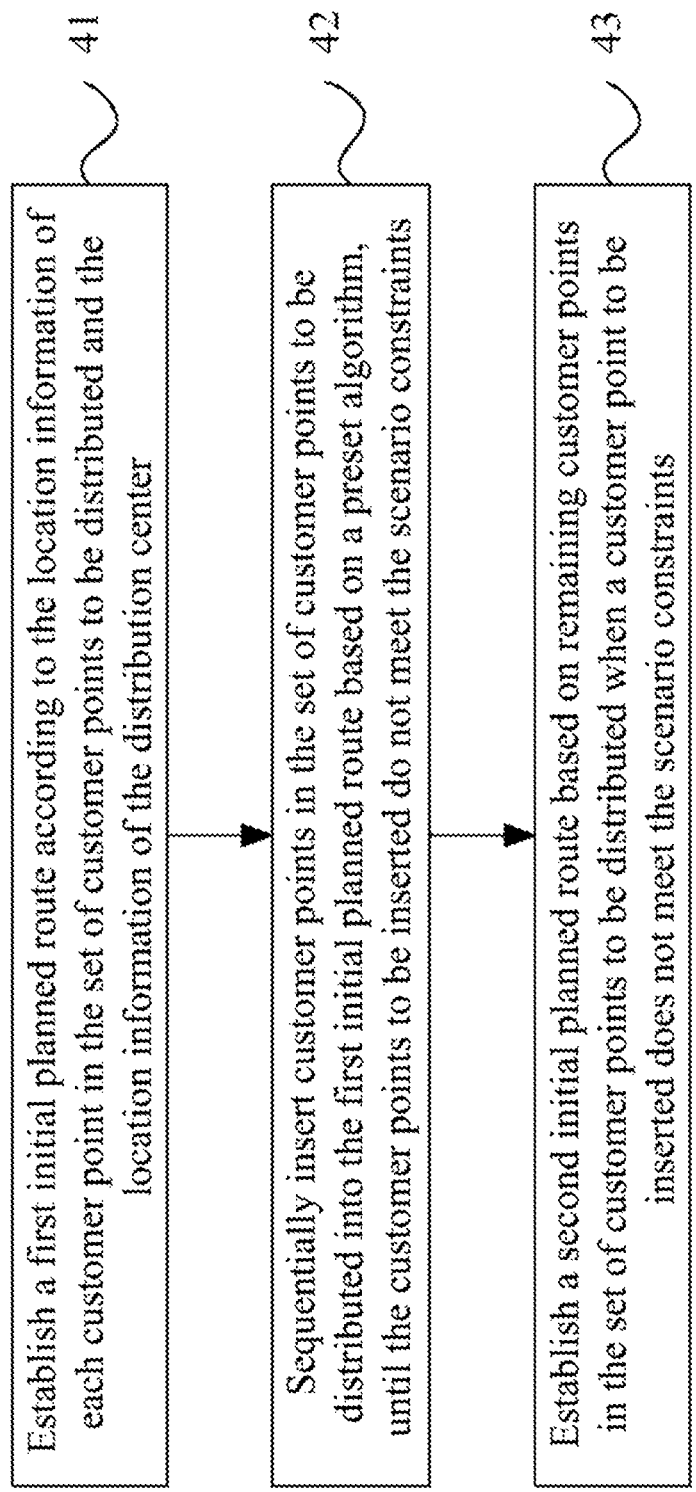
FIG. 4 is a schematic flowchart of Embodiment III of a route determination method for cold chain distribution provided by an embodiment of the present application.

For example, on the basis of the foregoing embodiment, FIG. 4 is a schematic flowchart of Embodiment III of a route determination method for cold chain distribution provided by an embodiment of the present application. Referring to FIG. 4, in this embodiment, the above step 31 can be implemented by the following steps.

Step 41, establish a first initial planned route according to the location information of each customer point in the set of customer points to be distributed and the location information of the distribution center.

A seeded customer point of the first initial planned route meets the scenario constraints and is a farthest customer point from the distribution center.

In this embodiment, after obtaining the location information of each customer point in the set of customer points to be distributed and the location information of the distribution center, the server may first establish an initial planned route, and may use the vertex farthest from the distribution center as the seeded customer point of the initial planned route.

It can be understood that, in this embodiment of the present application, in the case of determining the location and sequence of each customer point in the initial planned route, it is necessary to determine whether all the constraints in the scenario constraints are met.

Step 42, sequentially insert customer points in the set of customer points to be distributed into the first initial planned route based on a preset algorithm, until the customer points to be inserted do not meet the scenario constraints.

In this embodiment, after the first initial planned route is determined, the customer points are required to be inserted into the first initial planned route one by one in the case the customer points meet all the constraints in the scenario constraints, so that one vehicle can simultaneously distribute goods to multiple customer points along a planned route.

For example, the preset algorithm in this embodiment may be an insertion algorithm, that is, it is a process of obtaining a feasible solution by using the insertion algorithm. The insertion algorithm is also called the farthest insertion algorithm. First, the customer point farthest from the distribution center is selected as the seeded customer point (starting point), and it is determined whether all the constraints in the scenario constraints are met; if yes, the customer points to be inserted are then selected in turn from the set of customer points to be distributed according to the nearest neighbor method, and it is ensured that all inserted customer points meet all the constraints in the scenario constraints. Once the initial solution is established, it is ensured that the initial solution is feasible.

Further, in the embodiment of the present application, before the step 41, the method may further include the following steps:

A1, determine, according to the location information of each customer point in the set of customer points to be distributed and the location information of the distribution center, a navigation distance between any two customer points and a navigation distance between each customer point and the distribution center; and A2, build a distance matrix according to the navigation distance between any two customer points and the navigation distance between each customer point and the distribution center.

In this embodiment, the server may determine, according to the location information of each customer point in the set of customer points to be distributed and the location information of the distribution center, a navigation distance between any two customer points and a navigation distance between each customer point and the distribution center, and then build a distance matrix according to the navigation distance between any two customer points and the navigation distance between each customer point and the distribution center, which lays the groundwork for the subsequent determination of a distribution route that is more in line with actual needs.

For example, for the application scenario of a distribution center and three customer points, four such points may form a 4*4 distance matrix.

Correspondingly, the step 42 can be implemented as follows:

sequentially inserting the customer points in the set of customer points to be distributed into the first initial planned route based on a nearest neighbor interpolation method, the above distance matrix and a saving algorithm.

For example, in this embodiment, a feasible solution can be obtained based on the nearest neighbor interpolation method, the above distance matrix, and the saving algorithm. The customer point, of which the navigation distance is closest to the current customer point, is selected as the next insertion point according to the nearest neighbor interpolation method, the saving algorithm is then used, and the location of the customer point in the initial planned route is determined based on the customer point with the greatest saving value, that is, the sequence of the inserted customer points on the initial planned route is determined. The steps of selecting and inserting are repeatedly performed according to the above method, and each inserting process meets the scenario constraints.

Step 43, establish a second initial planned route based on remaining customer points in the set of customer points to be distributed when a customer point to be inserted does not meet the scenario constraints.

In this embodiment, in the case that the customer point inserted on the first initial planned route does not meet the scenario constraints, for example, requirements for the customer's time window or for the on-route duration are not met, it indicates that neither the customer point to be inserted nor the remaining customer points can be planned on the first initial planned route. At this point, based on the remaining customer points in the set of customer points to be distributed, a second initial planned route can be established according to the route planning method of step 41 and step 42, and the customer points to be distributed are sequentially inserted into the second initial planned route until a customer point to be distributed does not meet the above scenario constraints or the insertion is completed.

It can be understood that if all the remaining customer points cannot be planned on the second initial planning route, other new initial planned routes will be then established, until all customer points are planned under the premise of meeting the scenario constraints.

The route determination method for cold chain distribution provided by the embodiment of the present application establishes a first initial planned route according to the location information of each customer point in the set of customer points to be distributed and the location information of the distribution center; sequentially inserts customer points in the set of customer points to be distributed into the first initial planned route based on a preset algorithm, until the customer points to be inserted do not meet the scenario constraints; establishes a second initial planned route based on remaining customer points in the set of customer points to be distributed when a customer point to be inserted does not meet the scenario constraints. The technical solution can firstly determine at least one initial planned route that meets the scenario constraints, thus providing the possibility to obtain at least one target distribution route subsequently.

Figure 5:
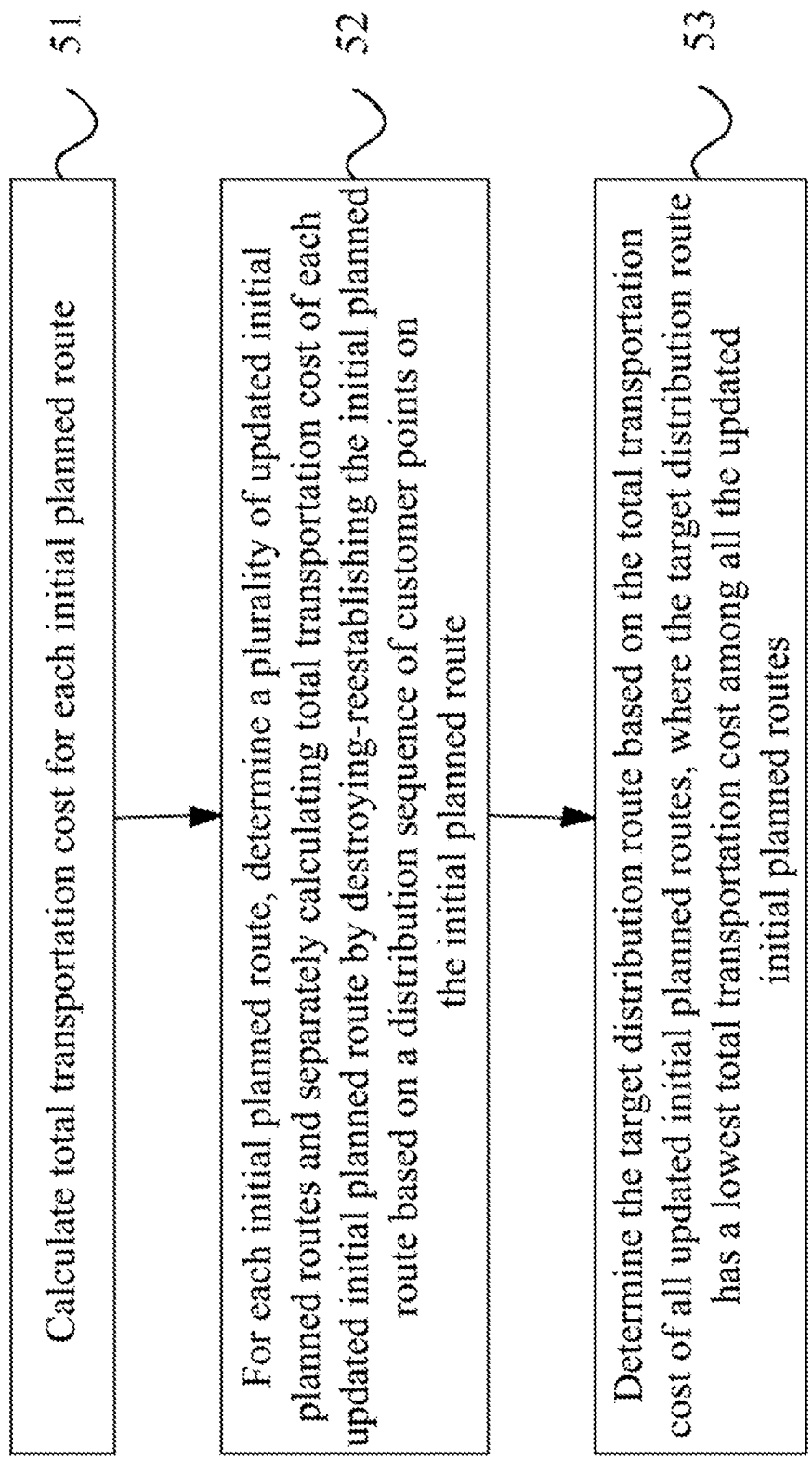
FIG. 5 is a schematic flowchart of Embodiment IV of a route determination method for cold chain distribution provided by an embodiment of the present application.

Further, on the basis of the above embodiment, FIG. 5 is a schematic flowchart of Embodiment IV of a route determination method for cold chain distribution provided by an embodiment of the present application. Referring to FIG. 5, in this embodiment, the above step 32 may be implemented by the following steps.

Step 51, calculate total transportation cost for each initial planned route.

In the embodiment of the present application, the total transportation cost of each initial planned route can be calculated according to both the point locations of the customer points of each initial planned route and the point cost of each customer point, so as to provide conditions for subsequent update of the initial planned routes.

For example, the total transportation cost may refer to the total transportation distance, so that the formula (1) in the embodiment shown in FIG. 3 can be used to find the solution.

Step 52, for each initial planned route, determine a plurality of updated initial planned routes and separately calculating total transportation cost of each updated initial planned route by destroying-reestablishing the initial planned route based on a distribution sequence of customer points on the initial planned route.

In an embodiment, for each initial planned route, the distribution sequence of the customer points on each initial planned route can form a new initial planned route by destroying-reestablishing (i.e., destroy and repair) the initial planned route, and the way of destroying-reestablishing the initial planned route is to form a new initial planned route through multiple ways of truncation and reconnection.

In this embodiment, after obtaining the updated initial planned route, the total transportation cost of each updated initial planned route can be calculated according to both the point locations of the customer points of each updated initial planned route and the point cost of each customer point. This step is repeated until the method meets the termination conditions; for example, the termination conditions mainly include the number of iterations, the solving time of the algorithm, the iterative interval when a better solution is not found in succession for termination, and so on.

Step 53, determine the target distribution route based on the total transportation cost of all updated initial planned routes, where the target distribution route has a lowest total transportation cost among all the updated initial planned routes.

In this embodiment, the total transportation cost in the updated initial planned route can be calculated separately each time the initial planned route is updated, and a coefficient is assigned to each updated initial planned route, where the coefficient is used to represent the pros and cons of each updated initial planned route. Finally, the route with the lowest total transportation cost is determined as the target distribution route according to the total transportation cost in all the updated initial planning routes.

In the method provided by the embodiment of the present application, the target distribution route is determined by the iterative search, which not only can meet all the constraints, but also have low transportation cost and high practicability.

In summary, the cold chain distribution scenario applicable to the route determination method for cold chain distribution proposed by the embodiments of FIG. 3 to FIG. 5 is relatively novel, and is a cold chain city distribution scenario with time window and practical application scenarios. Such scenario involves a large number of customer points (greater than 500), single-vehicle distribution, adequate vehicle resources, all vehicles departing from the same distribution center, but not returning to the distribution center after the distribution is completed, etc. Constraints considered include: time window constraints strictly meeting the customer (distribution time-effect requirement), and duration constraints with vehicle on-route (on-route duration of each vehicle is not greater than a given value). The goal is to minimize the total transportation cost or total transportation distance. This solution uses the insertion algorithm to establish the initial solution and to find a better solution based on the adaptive neighborhood search algorithm framework, so as to determine the target distribution route, which is highly practical.

Exemplary, in another possible design of the present application, in this embodiment, the above step 22 may be implemented as follows:

input the location information of all customer points in the set of customer points to be distributed and the location information of the distribution center into a wiring model, and output the at least one target distribution route, where customer points in each target distribution route meet the scenario constraints, and transportation cost of each target distribution route meets the transportation cost constraints.

In this embodiment, a wiring model can be run in the server. The wiring model can be determined based on the historical wiring solution, and can automatically output at least one target distribution route based on the location information of all customer points in the set of customer points to be distributed and the location information of the distribution center.

It is worth noting that, in this embodiment, the wiring model is obtained by training based on the location information of historical customer points and the location information of the distribution center, under the premise of meeting scene constraints and transportation cost constraints. Therefore, the customer points in each target distribution route output by the wiring model meet the scenario constraints and the transportation cost of each target distribution route meets the transportation cost constraints.

In the embodiments of the present application, the wiring model is used to find a solution for determining the target distribution route. In the design process, many algorithm parameters are often involved, ranging from hundreds to a dozen. It is very important in the smart wiring of cold chain distribution to update the parameters of the wiring model, so as to improve the performance of the wiring model.

At present, there are few solutions for parameter tuning of the wiring model. Generally, the tuning parameters are manually modified, that is, upon experience and personal preference, the tester selects several parameters to be updated, enumerates various possible values, runs the algorithm over and over again, and observes the algorithm score for these parameter combinations. This method is not only time-consuming, but also has poor tuning effect. In view of this problem, in the route determination method for cold chain distribution provided by the embodiment of the present application, on the premise of determining the target distribution route, a combination of operations research and machine learning algorithms can also be used to realize the tuning and updating of the parameters of the wiring model, which increases the scope of application of the wiring model.

It is understandable that in the parameter tuning of the wiring model, the following problems is required to be solved: determine the parameters to be updated when it is impossible to update all parameters iteratively among a large number of model parameters, and search and change the values of these parameters after determining the updated parameter list. The technical solutions provided by the embodiments of the present application scientifically and accurately evaluate the importance of each model parameter by formulating a model of operations research algorithm plus machine learning algorithm, and select a preset number of parameters according to the importance of the model parameters; for example, it is stored in the parameter calculation table, and the number of elements inputting into the parameter calculation table can be gradually increased; after the parameters to be updated are selected, grid-search and cross-validation are mainly used to update the wiring model. Explanations will be given below with specific examples.

Figure 6:
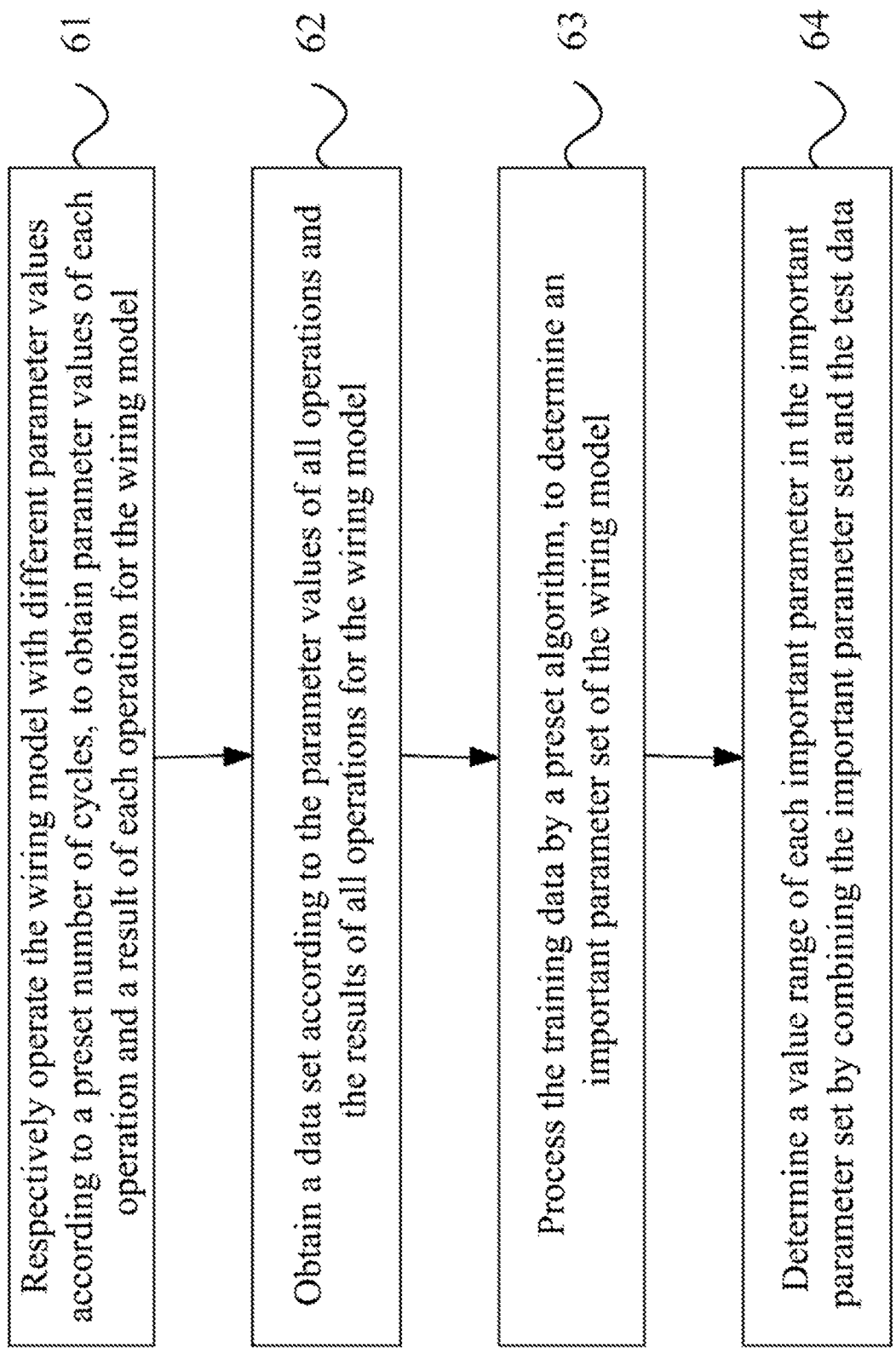
FIG. 6 is a schematic flowchart of Embodiment V of a route determination method for cold chain distribution provided by an embodiment of the present application.

For example, FIG. 6 is a schematic flowchart of Embodiment V of a route determination method for cold chain distribution provided by an embodiment of the present application. Referring to FIG. 6, the method further includes the following steps.

Step 61, respectively operate the wiring model with different parameter values according to a preset number of cycles, to obtain parameter values of each operation and a result of each operation for the wiring model.

Step 62, obtain a data set according to the parameter values of all operations and the results of all operations for the wiring model.

The data set includes training data and test data.

In this embodiment, the performance of the wiring model can be measured by the total transportation cost of each route, and is characterized by taking the total transportation cost of the route as the objective function. It can be understood that the total transportation cost is related to the number of formed routes and the cost of each customer point. The specific formula is as follows:

$$f = \sum_{k=1}^{n} \sum_{j=1}^{m} ind_{ij} * c + \sum_{k=1}^{l} p * g(d, c, m, fc) \quad (4)$$

$$fc = \max_{i} \sum_{j=1}^{m} ind_{ij}, i = 1, 2, \ldots, n \quad (5)$$

$$d = \max_{i} \sum_{j=1}^{lr-1} d_{ijk}, i = 1, 2, \ldots, n, k = j + 1 \quad (6)$$

where n is the total number of target distribution routes output by the wiring model; m is the total number of customers in the set of customer points to be distributed; lr is the total number of customer points in the route; $ind_{ij}$ indicates whether the $j^{th}$ customer point exists in the $i^{th}$ route; if yes, $ind_{ij}=1$; if not, $ind_{ij}=0$; c is the point cost of customer points, which is a constant; l is the number of unplanned customer points; p is the penalty coefficient for unplanned points; g(d,c,n,m) is the penalty function for unplanned customer points; d is the length of the longest one among all the routes, and $d_{ijk}$ is the distance between the $j^{th}$ customer point and the $k^{th}$ customer point in the $i^{th}$ route; f c is the number of the maximum customer points planned in the $i^{th}$ route.

Figure 7:
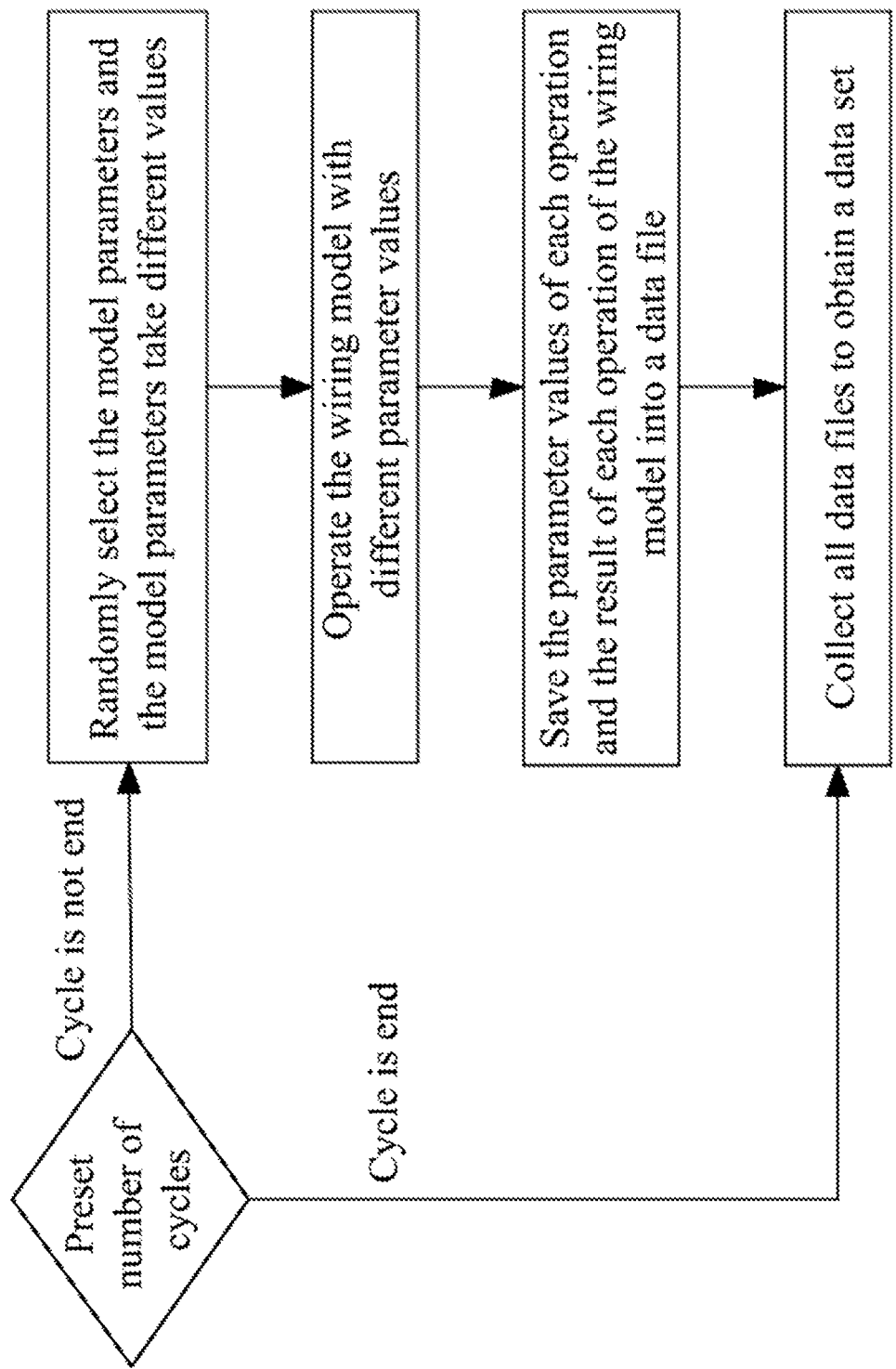
FIG. 7 is a block diagram of determining a data set in the embodiment shown in FIG. 6.

In this embodiment, in order to determine important parameters among all model parameters of the wiring model, the data set to be analyzed is required to be obtained first. FIG. 7 is a block diagram of determining a data set in the embodiment shown in FIG. 6. Referring to FIG. 7, first, the model parameters are randomly selected and the model parameters take different values; next, the wiring model with different parameter values is operated to obtain the parameter value of each operation and the result of each operation of the wiring model. For example, the parameter values of each operation and the result of each operation can be saved into a data file, the above process is performed cyclically according to the preset number of cycles (for example, 1000 times or other times, which is not limited in this embodiment), and all data files are collected to obtain a data set.

Figure 8:
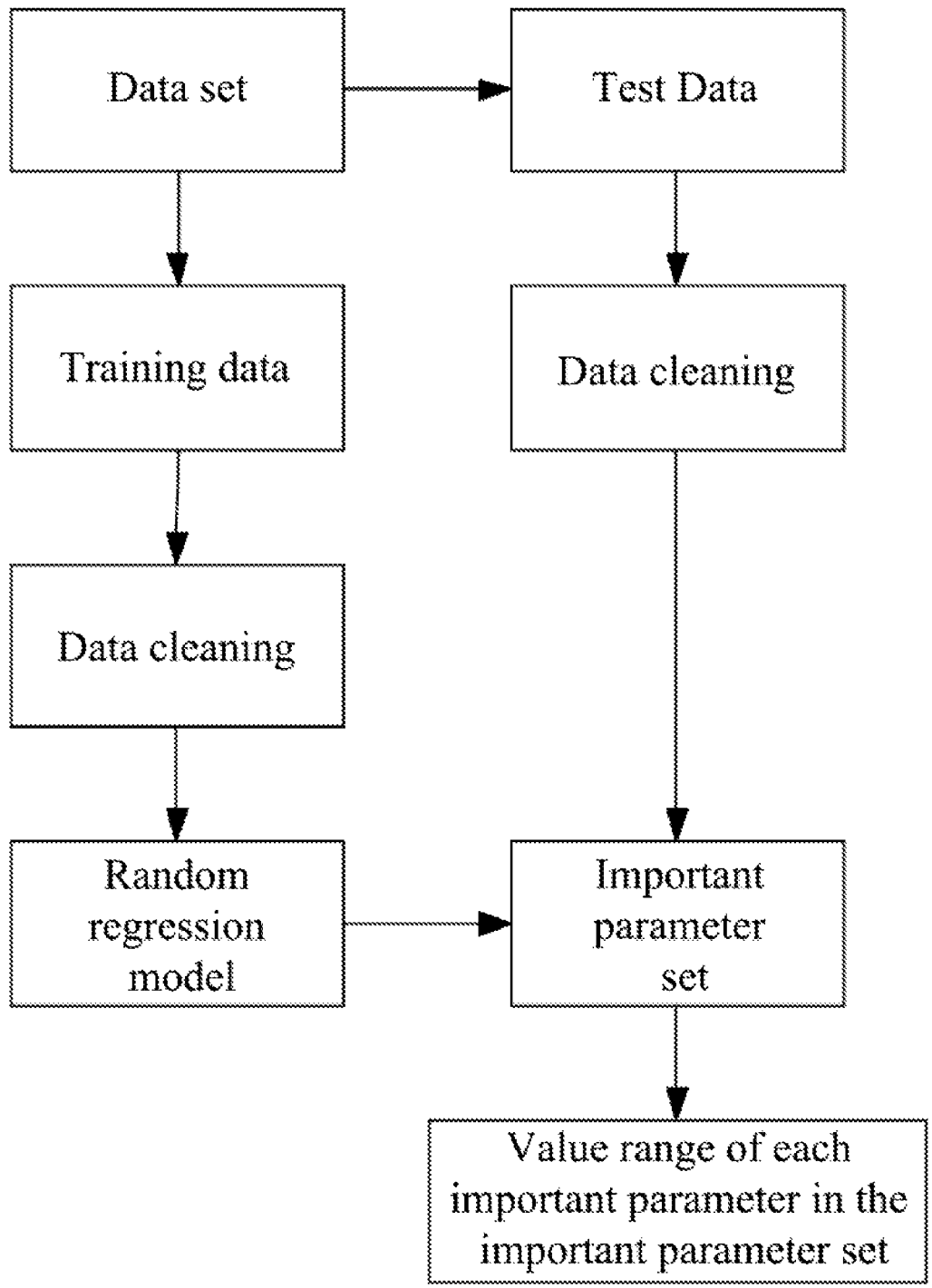
FIG. 8 is a block diagram of determining an important parameter set in the embodiment shown in FIG. 6.

For example, in this embodiment, FIG. 8 is a block diagram of determining an important parameter set in the embodiment shown in FIG. 6. Referring to FIG. 8, in order to verify the important parameters later, the obtained data set can be divided into training data and test data, so as to use the training data to determine the important parameter set, and use the test data to verify the obtained important parameter set.

Step 63, process the training data by a preset algorithm, to determine an important parameter set of the wiring model.

In this embodiment, referring to FIG. 8, this embodiment uses the training data to determine an important parameter set of the wiring model. Specifically, in order to improve the processing efficiency, the training data in the data set is first preprocessed, for example, data cleaning, etc., and then a preset algorithm is used to process the data-cleaned training data to select an important parameter set. In an embodiment, the preset algorithm can be a random regression model, which can select the important parameter set from a large amount of training data.

Step 64, determine a value range of each important parameter in the important parameter set by combining the important parameter set and the test data.

For example, the important parameter set obtained by the server may be written into a preconfigured importance table. Referring to FIG. 8, in order to determine the value of each important parameter in the important parameter set, data cleaning and other processing can also be performed on the test data divided from the data set, and then the cleaned test data is used to determine the value range of each important parameter in the important parameter set.

Figure 9:
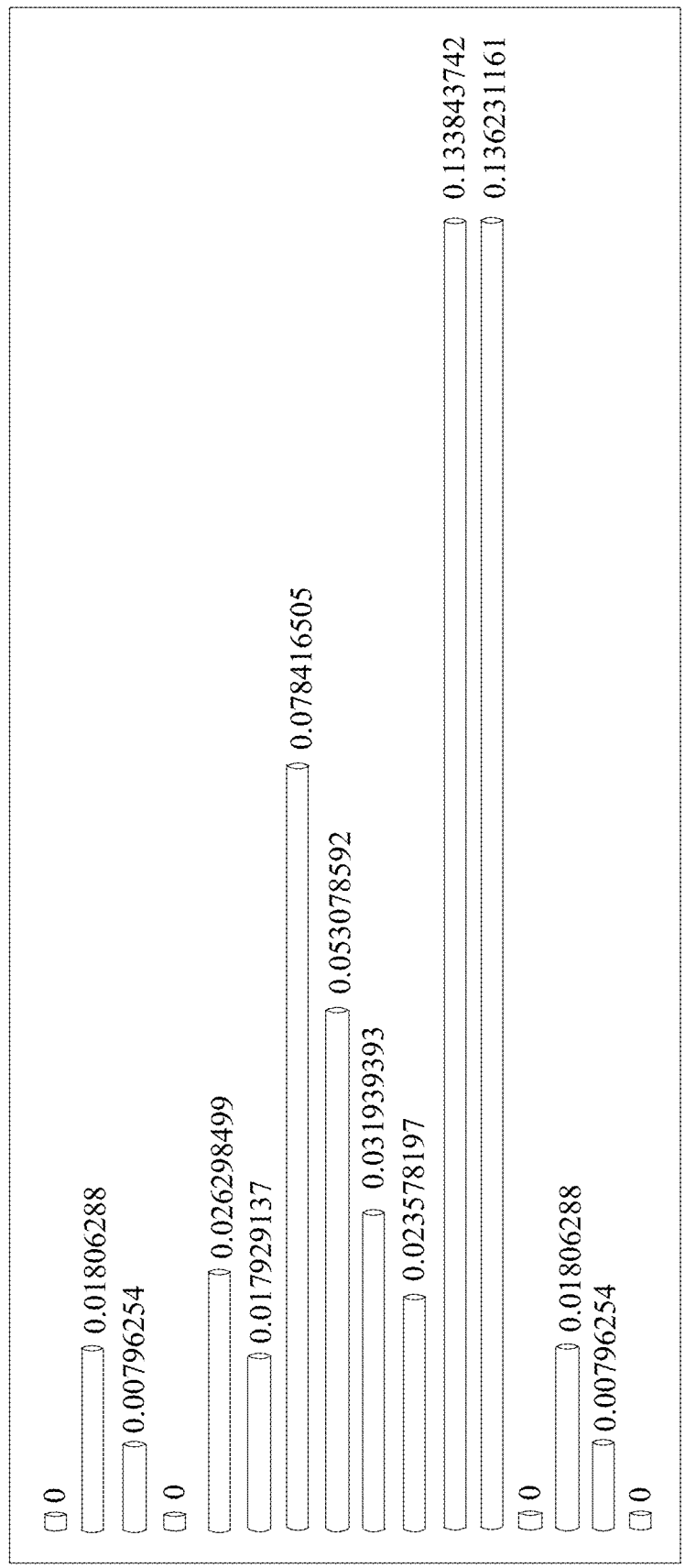
FIG. 9 is an importance characterization diagram of some parameters in model parameters.

For example, FIG. 9 is an importance characterization diagram of some parameters in model parameters. Referring to FIG. 9, the value of each important parameter in the important parameter set is obtained by using actual service data. In this embodiment, the longer the line segment is, the more important the parameter is. A threshold can be preconfigured in the server, and parameters whose parameter values are greater than the threshold are determined as important parameters.

The route determination method for cold chain distribution provided by the embodiment of the present application respectively operates the wiring model with different parameter values according to a preset number of cycles, to obtain parameter values of each operation and a result of each operation for the wiring model, and then obtains a data set; processes the training data in the data set by a preset algorithm, to determine an important parameter set of the wiring model; and finally determines a value range of each important parameter in the important parameter set by combining the important parameter set and the test data. In this technical solution, the important parameter set can be determined from massive model parameters, thus providing the possibility to realize the parameter tuning of the wiring model.

Figure 10:
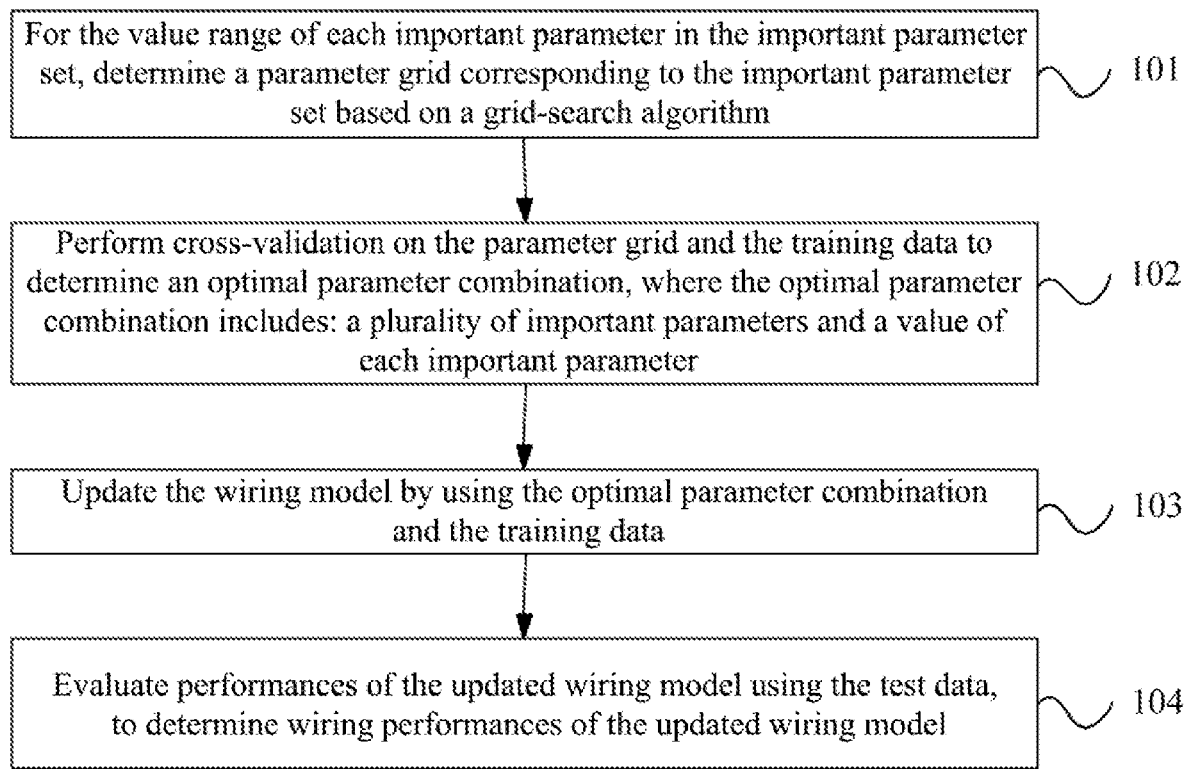
FIG. 10 is a schematic flowchart of Embodiment VI of a route determination method for cold chain distribution provided by an embodiment of the present application.

For example, on the basis of the above embodiment, FIG. 10 is a schematic flowchart of Embodiment VI of a route determination method for cold chain distribution provided by an embodiment of the present application. Referring to FIG. 10, the method further includes the following steps.

Step 101, for the value range of each important parameter in the important parameter set, determine a parameter grid corresponding to the important parameter set based on a grid-search algorithm.

In this embodiment, after the important parameter set is determined, the parameter grid is obtained using the value range of each important parameter in the important parameter set based on the grid-search algorithm. The grid-search algorithm is an exhaustive search method that specifies parameter values; that is, to permutate and combine the possible values of each important parameter and to list all possible combination results, so as to generate a parameter grid.

Step 102, perform cross-validation on the parameter grid and the training data to determine an optimal parameter combination, where the optimal parameter combination includes: a plurality of important parameters and a value of each important parameter.

Figure 11:
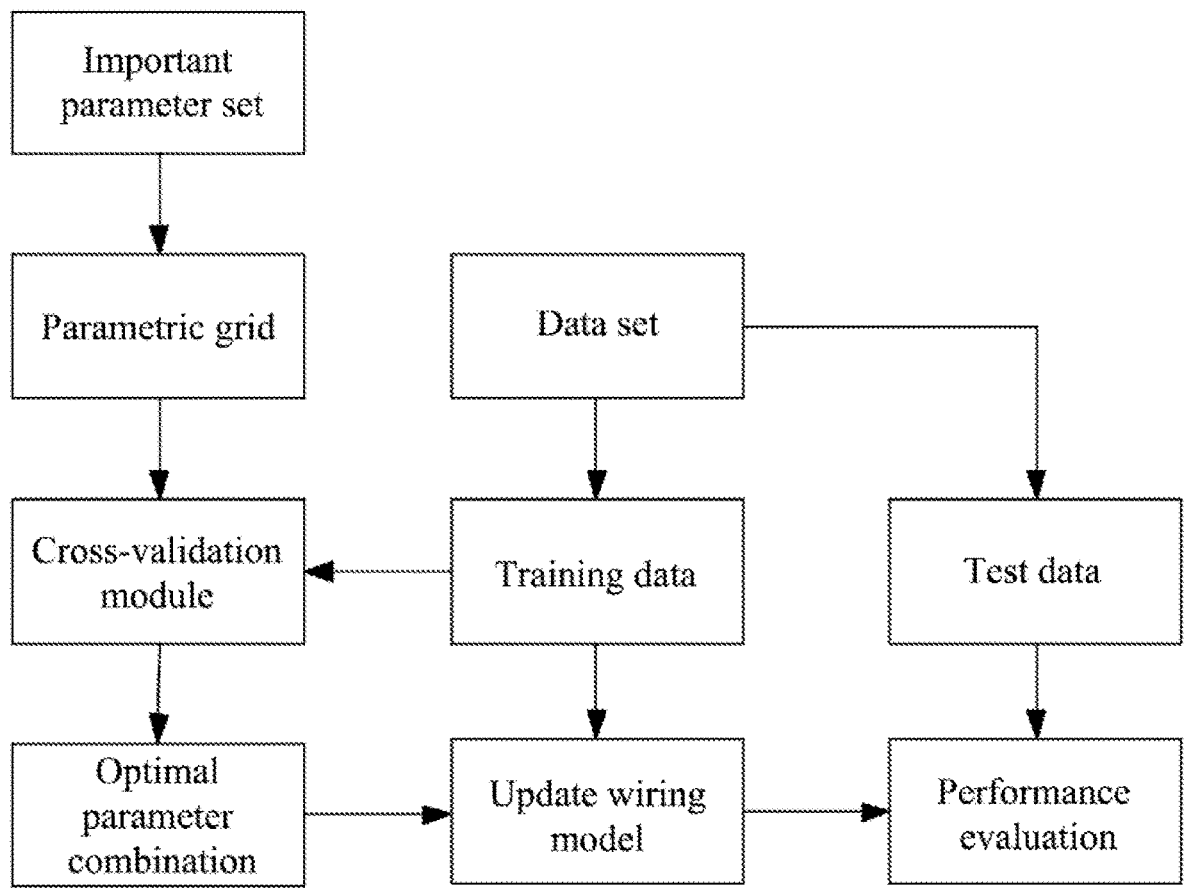
FIG. 11 is a frame diagram of updating the parameters of the wiring model.

For example, FIG. 11 is a frame diagram of updating the parameters of the wiring model. Referring to FIG. 11, after obtaining the parameter grid based on the important parameter set, the training data in the data set obtained above are then input into a cross-validation module to determine the optimal parameter combination, which includes: a plurality of important parameters and a value of each important parameter, that is, after trying all parameter combinations, an appropriate classifier is returned and the optimal parameter combination is automatically adjusted to.

Step 103, update the wiring model by using the optimal parameter combination and the training data.

In this embodiment, referring to FIG. 11, the number of important parameters obtained by performing the above steps increases gradually, and the optimal parameter combination and training data can be used to replace the parameters of the wiring model finally, to update the wiring model.

Further, in the embodiment of the present application, as shown in FIG. 10, the method may further include the following steps.

Step 104, evaluate performances of the updated wiring model using the test data, to determine wiring performances of the updated wiring model.

In this embodiment, referring to FIG. 11, the updated wiring model can also use the test data in the data set obtained above for performance evaluation, to verify the correctness of the above important parameter determination method and important parameter tuning solution.

The route determination method for cold chain distribution provided by the embodiments of the present application, for the value range of each important parameter in the important parameter set, determines a parameter grid corresponding to the important parameter set based on a grid-search algorithm; performs cross-validation on the parameter grid and the training data to determine an optimal parameter combination; and finally updates the wiring model by using the optimal parameter combination and the training data, thus implementing the update of the model parameters; further, evaluates performances of the updated wiring model using the test data, to determine wiring performances of the updated wiring model, thus implementing model parameter tuning, which lays the groundwork for the subsequent determination of an optimal distribution route.

The following are apparatus embodiments of the present application, which can be used to perform the method embodiments of the present application. For details not disclosed in the apparatus embodiments of the present application, please refer to the method embodiments of the present application.

Figure 12:
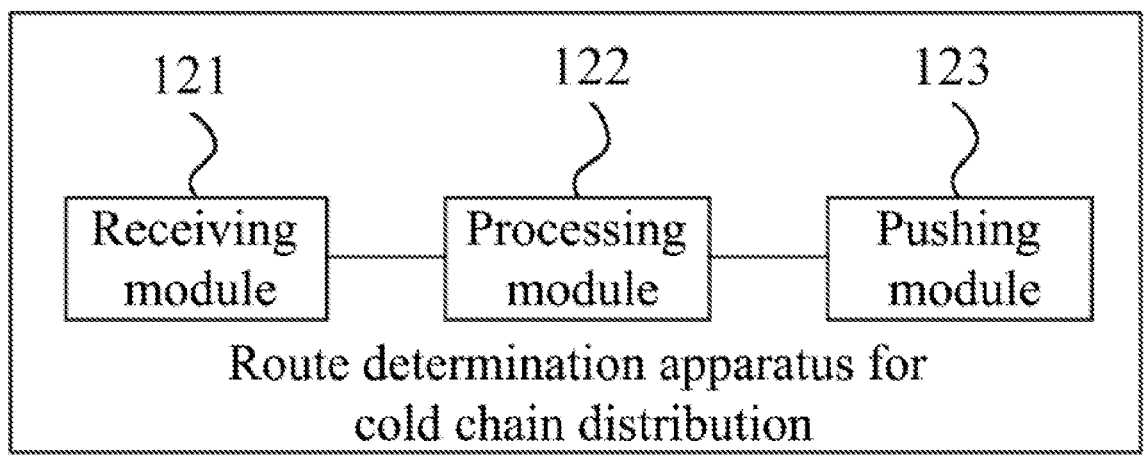
FIG. 12 is a schematic structural diagram of a route determination apparatus for cold chain distribution provided by an embodiment of the application.

FIG. 12 is a schematic structural diagram of a route determination apparatus for cold chain distribution provided by an embodiment of the application. The device can be integrated in a server, and can also be implemented by the server. Referring to FIG. 12, the apparatus may include: a receiving module 121, a processing module 122 and a pushing module 123; where the receiving module 121 is configured to receive a route determination request from a terminal device, where the route determination request includes: location information of each customer point in a set of customer points to be distributed and location information of a distribution center.

the processing module 122 is configured to determine at least one target distribution route according to the location information of each customer point in the set of customer points to be distributed, the location information of the distribution center, scenario constraints and transportation cost constraints; and the pushing module 123 is configured to push the at least one target distribution route to the terminal device.

In a possible design of this embodiment of the present application, the processing module 122 may include: a first processing unit and a second processing unit; where the first processing unit is configured to determine at least one initial planned route according to the location information of each customer point in the set of customer points to be distributed, the location information of the distribution center, and the scenario constraints, where the scenario constraints include: time window constraints of the customer points, on-route duration constraints, single-vehicle distribution, and no returning to the distribution center; and the second processing unit is configured to iteratively update each initial planned route with a solution target of lowest total transportation cost, to determine the at least one target distribution route.

In an embodiment, the first processing unit is specifically configured to:

establish a first initial planned route according to the location information of each customer point in the set of customer points to be distributed and the location information of the distribution center, where a seeded customer point of the first initial planned route meets the scenario constraints and is a farthest customer point from the distribution center;

sequentially insert customer points in the set of customer points to be distributed into the first initial planned route based on a preset algorithm, until the customer points to be inserted do not meet the scenario constraints; and establish a second initial planned route based on remaining customer points in the set of customer points to be distributed when a customer point to be inserted does not meet the scenario constraints.

Exemplary, the first processing unit is further configured to, before establishing the first initial planned route according to the location information of each customer point in the set of customer points to be distributed and the location information of the distribution center, determine, according to the location information of each customer point in the set of customer points to be distributed and the location information of the distribution center, a navigation distance between any two customer points and a navigation distance between each customer point and the distribution center; and build a distance matrix according to the navigation distance between any two customer points and the navigation distance between each customer point and the distribution center;

the first processing unit is configured to sequentially insert the customer points in the set of customer points to be distributed into the first initial planned route, is specifically that:

the first processing unit is specifically configured to sequentially insert the customer points in the set of customer points to be distributed into the first initial planned route based on a nearest neighbor interpolation method, the distance matrix and a saving algorithm.

As an example, the second processing unit is specifically configured to:

calculate total transportation cost for each initial planned route;

for each initial planned route, determine a plurality of updated initial planned routes and separately calculate total transportation cost of each updated initial planned route by destroying-reestablishing the initial planned route based on a distribution sequence of customer points on the initial planned route; and determine the target distribution route based on the total transportation cost of all updated initial planned routes, where the target distribution route has a lowest total transportation cost among all the updated initial planned routes.

In another possible design of the embodiment of the present application, the processing module 122 is specifically configured to input the location information of all customer points in the set of customer points to be distributed and the location information of the distribution center into a wiring model, and output the at least one target distribution route, where customer points in each target distribution route meet the scenario constraints, and transportation cost of each target distribution route meets the transportation cost constraints.

In an embodiment, the processing module 122 is further configured to:

respectively operate the wiring model with different parameter values according to a preset number of cycles, to obtain parameter values of each operation and a result of each operation for the wiring model;

obtain a data set according to the parameter values of all operations and the results of all operations for the wiring model, where the data set includes training data and test data;

process the training data by a preset algorithm, to determine an important parameter set of the wiring model; and determine a value range of each important parameter in the important parameter set by combining the important parameter set and the test data.

Exemplary, the processing module 122 is further configured to:

for the value range of each important parameter in the important parameter set, determine a parameter grid corresponding to the important parameter set based on a grid-search algorithm;

perform cross-validation on the parameter grid and the training data to determine an optimal parameter combination, where the optimal parameter combination includes: a plurality of important parameters and a value of each important parameter; and update the wiring model by using the optimal parameter combination and the training data.

Further, the processing module 122 is further configured to evaluate performances of the updated wiring model using the test data, to determine wiring performances of the updated wiring model.

The apparatus provided in the embodiments of the present application can be used to perform the method in the embodiments shown in FIG. 2 to FIG. 11, and the implementation principles and technical effects thereof are similar, which will not be repeated herein.

It should be noted that, understandably, the division of each module of the above device is only a logical function division, and in actual implementation, the module can be fully or partially integrated into a physical entity, or it can be physically separated. These modules can all be implemented in the form of calling software by processing elements; they can also be implemented in the form of hardware; it is also possible that some modules are implemented in the form of calling software by the processing elements, and some modules are implemented in the form of hardware. For example, the processing module may be separately established, or may be integrated in a chip of the above apparatus, or it may also be stored in the memory of the above apparatus in the form of program code, and the function of the above processing module may be called and executed by a processing element of the above apparatus. Implementations of other modules are similar. In addition, all or part of these modules can be integrated together, and can also be implemented separately. The processing element described here may be an integrated circuit with signal processing capability. In the implementation process, each step of the above method or each of the above modules can be accomplished by an integrated logic circuit of hardware in the processor element or by instructions in the form of software.

For example, the above modules may be one or more integrated circuits configured to implement the above methods, such as one or more application specific integrated circuits (ASICs), or one or more microprocessors (digital signal processors, DSPs), or one or more field programmable gate arrays (FPGAs). For another example, in the case one of the above modules is implemented in the form of calling program codes by the processing element, the processing element may be a general purpose processor, such as a central processing unit (CPU) or other processors that can call program codes. For a further example, these modules can be integrated together and implemented in the form of a system-on-a-chip (SOC).

In the above embodiments, it may be implemented in whole or in part by software, hardware, firmware or any combination thereof. In case of using software, it may be implemented in whole or in part in the form of a computer program product. The computer program product includes one or more computer instructions. When the computer program instructions are loaded and executed on a computer, all or part of the processes or functions described in the embodiments of the present application are generated. The computer may be a general purpose computer, special purpose computer, computer network, or other programmable apparatus. The computer instructions may be stored in a computer-readable storage medium, or may be transmitted from one computer-readable storage medium to another one. For example, the computer instructions may be sent from one website, computer, server, or data center to another website, computer, server or data center via wired connection (such as, the coaxial cable, fiber optic, digital subscriber line (DSL)) or wireless connection (such as, infrared, wireless, microwave). The computer-readable storage medium can be any available medium that a computer can access or may be a data storage device such as a server, a data center, or the like that includes one or more available media integrations. The usable medium may be a magnetic medium (such as, the floppy disk, hard disk, and tape), optical media (such as, digital video disk (DVD)), or semiconductor medium ((such as the solid state disk (SSD)), etc.

Figure 13:
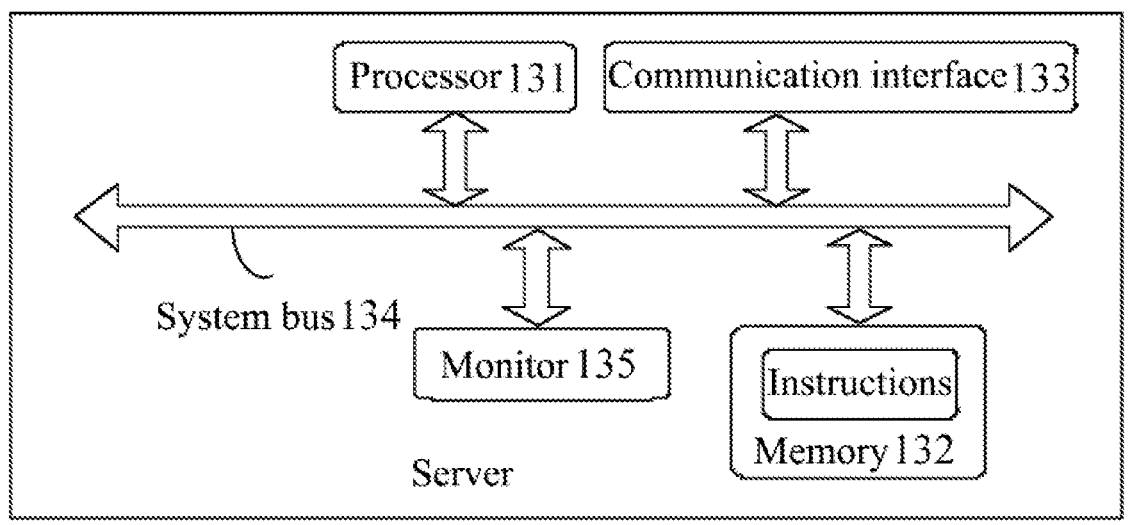
FIG. 13 is a schematic structural diagram of a server embodiment provided by an embodiment of the present application.

FIG. 13 is a schematic structural diagram of a server embodiment provided by an embodiment of the present application. As shown in FIG. 13, the apparatus may include: a processor 131, a memory 132, a communication interface 133, a system bus 134 and a display 135. The memory 132, the communication interface 133 and the display 135 are connected to the processor 131 through the system bus 134 to communicate with each other, the memory 132 is used to store computer program instructions, the display 135 is used to display the processing result of the processor 131, the communication interface 133 is used to communicate with other devices, and the processor 131 executes the computer program instructions, causing the solution of the embodiments shown in FIG. 2 to FIG. 11 to be implemented.

The system bus mentioned in FIG. 13 may be a peripheral component interconnect (PCI) bus, an extended industry standard architecture (EISA) bus, etc. The system bus can be divided into an address bus, a data bus, a control bus, etc. For ease of presentation, only one thick line is used in the figure, which does not indicate that there is only one bus or one type of bus. The communication interface is used to realize the communication between the database access apparatus and other devices (for example, the client, read-write library and read-only library). The memory may include the random access memory (RAM), and may also include the non-volatile memory, for example, at least one disk memory.

The above processor may be a general-purpose processor, including a CPU, a network processor (NP), etc.; it can also be the digital signal processor (DSP), application specific integrated circuit (ASIC), field programmable gate array (FPGA) or other programmable logic devices, discrete gate or transistor logic devices, discrete hardware components.

An embodiment of the present application further provides a computer-readable storage medium having stored thereon instructions, which, when executed on a computer, cause the computer to perform the method according to the embodiments shown in FIG. 2 to FIG. 11.

An embodiment of the present application further provides a chip for executing instructions, where the chip includes a memory and a processor, the memory has stored therein codes and data, the memory is coupled to the processor, and the processor executes the codes in the memory, so that the chip performs the method according to the embodiments shown in FIG. 2 to FIG. 11.

An embodiment of the present application further provides a computer program product including a computer program, where the computer program is stored in a storage medium, from which at least one processor can read the computer program, when the at least one processor executes the computer program, the method according to the embodiments shown in FIG. 2 to FIG. 11 can be implemented.

An embodiment of the present application further provides a computer program, which, when executed by a processor, causes the method according to the embodiments shown in FIG. 2 to FIG. 11 to be performed.

In the present application, "at least one" indicates one or more, "multiple" indicates two or more. "And/or" describes the association relationship of associated objects, and indicates that there can be three kinds of relationships, for example, A and/or B, may indicate: A exists alone; A and B exist at the same time; B exists alone, where A and B can be singular or plural. The character "l" generally indicates that the associated objects are of an "or" relationship; in the formula, the character "l" indicates that the associated objects are of a "division" relationship. "At least one of the following" or similar expressions refer to any combination thereof, including any combination of single item(s) or plural item(s). For example, at least one of a, b, or c may indicate: a, b, c, a-b, a-c, b-c, or a-b-c, where a, b, c can be singular or plural.

It can be understood that the various numeral numbers involved in the embodiments of the present application are only used for distinction for convenience of description, rather than limiting the scope of the embodiments of the present application. The sequence numbers of the above processes do not indicate the sequence of execution, which should be determined by its functions and internal logic, and should not constitute any limitation on the implementation process of the embodiments of the present application.

Finally, it should be noted that the above embodiments are merely for illustrating, instead of limiting the technical solutions of the present application. Although the present application has been illustrated in detail with reference to the above embodiments, a person ordinarily skilled in the art should understand: The technical solution described in the above embodiments may be modified or equivalently substituted for some or all of the technical features, and the modifications and substitutions should do not cause the essence of the corresponding technical solutions depart from the scope of the technical solution of the embodiments of the present application.

The invention claimed is:

1. A route determination method for cold chain distribution, comprising:

receiving a route determination request from a terminal device, wherein the route determination request comprises: location information corresponding to each customer point in a set of customer points to be distributed and location information of a distribution center;

determining at least one target distribution route according to the location information corresponding to each customer point in the set of customer points to be distributed, the location information of the distribution center, scenario constraints and transportation cost constraints, wherein the scenario constraints comprise: time window constraints of the customer points, on-route duration constraints, single-vehicle distribution, and no returning to the distribution center; and sending the at least one target distribution route to the terminal device for controlling the terminal device to perform the cold chain distribution according to the at least one target distribution route.

2. The method according to claim 1, wherein the determining at least one target distribution route according to the location information corresponding to each customer point in the set of customer points to be distributed, the location information of the distribution center, scenario constraints and transportation cost constraints, comprises:

determining at least one initial planned route according to the location information corresponding to each customer point in the set of customer points to be distributed, the location information of the distribution center, and the scenario constraints; and iteratively updating each initial planned route with a solution target of lowest total transportation cost, to determine the at least one target distribution route, wherein the at least one target distribution route meets the scenario constraints.

3. The method according to claim 2, wherein the determining at least one initial planned route according to the location information corresponding to each customer point in the set of customer points to be distributed, the location information of the distribution center, and the scenario constraints, comprises:

establishing a first initial planned route according to the location information corresponding to each customer point in the set of customer points to be distributed and the location information of the distribution center, wherein a seeded customer point of the first initial planned route meets the scenario constraints and is a farthest customer point from the distribution center;

inserting customer points in the set of customer points to be distributed sequentially into the first initial planned route based on a preset algorithm, until the customer points to be inserted do not meet the scenario constraints;

establishing a second initial planned route based on remaining customer points in the set of customer points to be distributed when a customer point to be inserted does not meet the scenario constraints; and inserting the customer point to be inserted and the remaining customer points in the set of customer points to be distributed sequentially into the second initial planned route based on the preset algorithm, until the insertion is completed, wherein all of the customer points meet the scenario constraints.

4. The method according to claim 3, wherein before the establishing a first initial planned route according to the location information corresponding to each customer point in the set of customer points to be distributed and the location information of the distribution center, the method further comprises:

determining, according to the location information corresponding to each customer point in the set of customer points to be distributed and the location information of the distribution center, a navigation distance between any two of all customer points and a navigation distance between each customer point and the distribution center; and building a distance matrix according to the navigation distance between any two of all customer points and the navigation distance between each customer point and the distribution center;

the inserting customer points in the set of customer points to be distributed sequentially into the first initial planned route based on a preset algorithm, comprises:

inserting the customer points in the set of customer points to be distributed sequentially into the first initial planned route based on a nearest neighbor interpolation method, the distance matrix and a saving algorithm.

5. The method according to claim 2, wherein the iteratively updating each initial planned route with a solution target of lowest total transportation cost, to determine the at least one target distribution route, comprises:

calculating total transportation cost for each initial planned route;

for each initial planned route, determining a plurality of updated initial planned routes and calculating total transportation cost of each updated initial planned route by destroying-reestablishing the initial planned route based on a distribution sequence of customer points on the initial planned route, wherein the destroying-reestablishing the initial planned route is to form a new initial planned route through multiple ways of truncation and reconnection; and determining the target distribution route based on the total transportation cost of all updated initial planned routes, wherein the target distribution route has a lowest total transportation cost among all the updated initial planned routes.

6. The method according to claim 1, wherein the determining at least one target distribution route according to the location information corresponding to each customer point in the set of customer points to be distributed, the location information of the distribution center, scenario constraints and transportation cost constraints, comprises:

inputting the location information corresponding to all customer points in the set of customer points to be distributed and the location information of the distribution center into a wiring model, and outputting the at least one target distribution route, wherein customer points in each target distribution route meet the scenario constraints, and transportation cost of each target distribution route meets the transportation cost constraints, wherein the at least one target distribution route meets the scenario constraints.

7. The method according to claim 6, further comprising:

operating the wiring model with different parameter values according to a preset number of cycles, to obtain parameter values of each operation and a result of each operation for the wiring model;

obtaining a data set according to the parameter values of all operations and the results of all operations for the wiring model, wherein the data set comprises training data and test data;

processing the training data by a preset algorithm, to determine an important parameter set of the wiring model; and determining a value range of each important parameter in the important parameter set by combining the important parameter set and the test data.

8. The method according to claim 7, further comprising:

for the value range of each important parameter in the important parameter set, determining a parameter grid corresponding to the important parameter set based on a grid-search algorithm;

performing cross-validation on the parameter grid and the training data to determine an optimal parameter combination, wherein the optimal parameter combination comprises: a plurality of important parameters and a value of each important parameter; and updating the wiring model by using the optimal parameter combination and the training data.

9. The method according to claim 8, further comprising:

determining wiring performances of the updated wiring model by using the test data.

10. A route determination apparatus for cold chain distribution, comprising: a memory, a processor, and a computer program stored on the memory and operable on the processor, wherein the processor, when running the computer program, is configured to:

control a communication interface to receive a route determination request from a terminal device, wherein the route determination request comprises: location information corresponding to each customer point in a set of customer points to be distributed and location information of a distribution center;

determine at least one target distribution route according to the location information corresponding to each customer point in the set of customer points to be distributed, the location information of the distribution center, scenario constraints and transportation cost constraints, wherein the scenario constraints comprise: time window constraints of the customer points, on-route duration constraints, single-vehicle distribution, and no returning to the distribution center; and send the at least one target distribution route to the terminal device for controlling the terminal device to perform the cold chain distribution according to the at least one target distribution route.

11. The apparatus according to claim 10, wherein the processor is configured to:

determine at least one initial planned route according to the location information corresponding to each customer point in the set of customer points to be distributed, the location information of the distribution center, and the scenario constraints; and iteratively update each initial planned route with a solution target of lowest total transportation cost, to determine the at least one target distribution route, wherein the at least one target distribution route meets the scenario constraints.

12. The apparatus according to claim 11, wherein the processor is configured to:

establish a first initial planned route according to the location information corresponding to each customer point in the set of customer points to be distributed and the location information of the distribution center, wherein a seeded customer point of the first initial planned route meets the scenario constraints and is a farthest customer point from the distribution center;

insert customer points in the set of customer points to be distributed sequentially into the first initial planned route based on a preset algorithm, until the customer points to be inserted do not meet the scenario constraints;

establish a second initial planned route based on remaining customer points in the set of customer points to be distributed when a customer point to be inserted does not meet the scenario constraints; and insert the customer point to be inserted and the remaining customer points in the set of customer points to be distributed sequentially into the second initial planned route based on the preset algorithm, until the insertion is completed, wherein all of the customer points meet the scenario constraints.

13. The apparatus according to claim 12, wherein the processor is further configured to, before establishing the first initial planned route according to the location information corresponding to each customer point in the set of customer points to be distributed and the location information of the distribution center, determine, according to the location information corresponding to each customer point in the set of customer points to be distributed and the location information of the distribution center, a navigation distance between any two of all customer points and a navigation distance between each customer point and the distribution center; and build a distance matrix according to the navigation distance between any two of all customer points and the navigation distance between each customer point and the distribution center; and insert the customer points in the set of customer points to be distributed sequentially into the first initial planned route based on a nearest neighbor interpolation method, the distance matrix and a saving algorithm.

14. The apparatus according to claim 12, wherein the processor is configured to:

calculate total transportation cost for each initial planned route;

for each initial planned route, determine a plurality of updated initial planned routes and calculate total transportation cost of each updated initial planned route by destroying-reestablishing the initial planned route based on a distribution sequence of customer points on the initial planned route, wherein the destroying-reestablishing the initial planned route is to form a new initial planned route through multiple ways of truncation and reconnection; and determine the target distribution route based on the total transportation cost of all updated initial planned routes, wherein the target distribution route has a lowest total transportation cost among all the updated initial planned routes.

15. The apparatus according to claim 11, wherein the processor is configured to:

calculate total transportation cost for each initial planned route;

for each initial planned route, determine a plurality of updated initial planned routes and calculate total transportation cost of each updated initial planned route by destroying-reestablishing the initial planned route based on a distribution sequence of customer points on the initial planned route, wherein the destroying-reestablishing the initial planned route is to form a new initial planned route through multiple ways of truncation and reconnection; and determine the target distribution route based on the total transportation cost of all updated initial planned routes, wherein the target distribution route has a lowest total transportation cost among all the updated initial planned routes.

16. The apparatus according to claim 10, wherein the processor is configured to input the location information corresponding to all customer points in the set of customer points to be distributed and the location information of the distribution center into a wiring model, and output the at least one target distribution route, wherein customer points in each target distribution route meet the scenario constraints, and transportation cost of each target distribution route meets the transportation cost constraints, wherein the at least one target distribution route meets the scenario constraints.

17. The apparatus according to claim 16, wherein the processor is further configured to:

operate the wiring model with different parameter values according to a preset number of cycles, to obtain parameter values of each operation and a result of each operation for the wiring model;

obtain a data set according to the parameter values of all operations and the results of all operations for the wiring model, wherein the data set comprises training data and test data;

process the training data by a preset algorithm, to determine an important parameter set of the wiring model; and determine a value range of each important parameter in the important parameter set by combining the important parameter set and the test data.

18. The apparatus according to claim 17, wherein the processor is further configured to:

for the value range of each important parameter in the important parameter set, determine a parameter grid corresponding to the important parameter set based on a grid-search algorithm;

perform cross-validation on the parameter grid and the training data to determine an optimal parameter combination, wherein the optimal parameter combination comprises: a plurality of important parameters and a value of each important parameter; and update the wiring model by using the optimal parameter combination and the training data.

19. The apparatus according to claim 18, wherein the processor is further configured to determine wiring performances of the updated wiring model by using the test data.

20. A non-transitory computer-readable storage medium, wherein the computer-readable storage medium has stored therein computer program instructions, which, when executed by a processor, cause the processor to:

control a communication interface to receive a route determination request from a terminal device, wherein the route determination request comprises: location information corresponding to each customer point in a set of customer points to be distributed and location information of a distribution center;

determine at least one target distribution route according to the location information corresponding to each customer point in the set of customer points to be distributed, the location information of the distribution center, scenario constraints and transportation cost constraints, wherein the scenario constraints comprise: time window constraints of the customer points, on-route duration constraints, single-vehicle distribution, and no returning to the distribution center; and send the at least one target distribution route to the terminal device for controlling the terminal device to perform the cold chain distribution according to the at least one target distribution route.

* * * * *